(12) United States Patent
Jin et al.

(10) Patent No.: US 11,144,792 B2
(45) Date of Patent: Oct. 12, 2021

(54) WATER PURIFIER AND CONTROL METHOD THEREOF

(71) Applicant: LG ELECTRONICS INC., Seoul (KR)

(72) Inventors: Moon Sub Jin, Incheon (KR); Ji Hye Kim, Seoul (KR); Jin Sung Park, Seoul (KR); Ji Young Huh, Seoul (KR); Beom Oh Kim, Seoul (KR)

(73) Assignee: LG ELECTRONICS INC.

( * ) Notice: Subject to any disclaimer, the term of this patent is extended or adjusted under 35 U.S.C. 154(b) by 189 days.

(21) Appl. No.: 16/542,940

(22) Filed: Aug. 16, 2019

(65) Prior Publication Data
US 2019/0377973 A1    Dec. 12, 2019

(30) Foreign Application Priority Data

Jul. 18, 2019    (KR) .................. 10-2019-0087141

(51) Int. Cl.
*G06K 9/62* (2006.01)
*B67D 1/12* (2006.01)
*B67D 1/08* (2006.01)

(52) U.S. Cl.
CPC .......... *G06K 9/627* (2013.01); *B67D 1/0884* (2013.01); *B67D 1/1236* (2013.01); *G06K 9/6217* (2013.01)

(58) Field of Classification Search
CPC .. G06K 9/627; G06K 9/6217; G06K 9/00624; B67D 2210/00102;
(Continued)

(56) References Cited

U.S. PATENT DOCUMENTS

| 8,109,301 B1* | 2/2012 | Denise ............... G07F 9/023 141/360 |
| 2007/0267098 A1* | 11/2007 | Ozanne ............. B67D 1/1238 141/198 |

(Continued)

FOREIGN PATENT DOCUMENTS

| JP | 2007128379 | 5/2007 |
| KR | 101164157 | 12/2010 |

(Continued)

OTHER PUBLICATIONS

Korean Intellectual Property Office Application No. 10-2019-0087141, Office Action dated Nov. 21, 2020, 5 pages.

(Continued)

*Primary Examiner* — Donnell A Long
(74) *Attorney, Agent, or Firm* — Lee, Hong, Degerman, Kang & Waimey

(57) ABSTRACT

Disclosed are a water purifier and a control method thereof for controlling a main body by executing an artificial intelligence (AI) algorithm or a machine learning algorithm in a 5G environment established for the Internet of things. The control method of the water purifier according to the present disclosure includes a photographing step, a scanning step, a recognizing step, a calculating step, a determining step, and a water discharging step. When the water discharging step is initiated, the distance sensor generates real-time height information on the water surface, and may stop discharging water before a real-time height exceeds the highest point height.

12 Claims, 16 Drawing Sheets

(58) Field of Classification Search
CPC .. B67D 2210/00065; B67D 2210/0001; B67D 1/0888; B67D 1/0894; B67D 1/1238; B67D 1/124; B67D 1/0014; B67D 1/1236; B67D 1/0884
See application file for complete search history.

(56) References Cited

U.S. PATENT DOCUMENTS

| | | | |
|---|---|---|---|
| 2011/0036452 A1* | 2/2011 | Schnyder | B67D 1/0005 |
| | | | 141/83 |
| 2015/0336786 A1* | 11/2015 | Gardner | F24C 7/08 |
| | | | 222/1 |
| 2018/0201492 A1* | 7/2018 | Jung | B01D 35/04 |
| 2019/0093924 A1* | 3/2019 | Kim | H05B 6/06 |
| 2020/0156857 A1* | 5/2020 | Rider | B65D 83/44 |
| 2020/0288907 A1* | 9/2020 | Braje | B67D 1/0888 |

FOREIGN PATENT DOCUMENTS

| | | | |
|---|---|---|---|
| KR | 1020130119237 | | 10/2013 |
| KR | 20170071262 A | * | 6/2017 |
| KR | 1020170065161 | | 6/2017 |
| KR | 1020170071262 | | 6/2017 |
| KR | 1020180055511 | | 5/2018 |
| KR | 1020180109259 | | 10/2018 |
| KR | 1020180119310 | | 11/2018 |
| KR | 1020190040949 | | 4/2019 |

OTHER PUBLICATIONS

Korean Intellectual Property Office Application No. 10-2019-0087141, Notice of Allowance dated May 10, 2021, 2 pages.

\* cited by examiner

WATER PURIFIER AND CONTROL METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2019-0087141, filed on Jul. 18, 2019, the contents of which are hereby incorporated by reference herein in its entirety.

BACKGROUND OF THE DISCLOSURE

1. Field of the Disclosure

The present disclosure relates to a water purifier and a control method thereof, and more particularly, to a water purifier capable of removing contaminants by filtering water in a physical or chemical manner, and a control method thereof.

2. Description of Related Art

A water purifier refers to an appliance capable of removing contaminants by filtering water in a physical or chemical manner.

In this regard, Korean Patent Application Publication No. 10-2019-0040949, entitled "Water purifier," discloses a water purifier including a case, a water discharge part, and a manipulation part. The manipulation part is equipped with a take-out button and a touch sensor. A user may set a type (purified water, cold water, or hot water), a temperature, and an amount of water to be taken out, by manipulating the touch sensor before taking out the water. When the user presses the take-out button, the set type, temperature, and amount of water is discharged through one water discharge nozzle.

In Korean Patent Application Publication No. 10-2019-0040949, when the user presses the take-out button without manipulating the touch sensor, water of a type, a temperature, and an amount set by default is discharged. The user frequently discharges a glass of cold water in order to relieve thirst. Thus, while it is convenient to set the cold water by default, when hot water is required, the user has to select the hot water by manipulating the touch sensor.

However, in Korean Patent Application Publication No. 10-2019-0040949, there is a shortcoming in that even in a situation in which hot water is desired to be taken out, the user may habitually press the take-out button and thus receive cold water in his or her container. For example, a user may intend to drink hot coffee, but may put instant coffee in a cup and habitually press the take-out button. In addition, the user may put milk powder in a milk powder bottle and then press the take-out button without selecting hot water using the touch sensor. In such a case, the instant coffee and the milk powder mixed with the cold water may be discarded.

In addition, in Korean Patent Application Publication No. 10-2019-0040949, there is a shortcoming in that since the water to be taken out may be selected only by an absolute amount through the manipulation of the touch sensor, the amount of water to be taken out and a capacity of the container in which the water is contained may not exactly match each other. Accordingly, when a maximum setting value of the amount of water to be taken out is smaller than the capacity of the container, the user experiences the inconvenience of having to press the take-out button several times. When the amount of water to be taken out is set to infinity, if the timing to stop the taking-out is missed, the water may overflow the container. Further, even when a minimum setting value of the amount of water to be taken out is greater than the capacity of the container, the water may overflow the container if the timing to stop the taking-out is missed.

In this regard, Korean Patent Application Publication No. 10-2018-0055511, entitled "Amount of fluid extracting variable water purifier," discloses an amount of fluid extracting variable water purifier characterized in that a capacity of a container is calculated through a measuring unit, and an amount of water to be taken out is determined based on the capacity of the container.

In Korean Patent Application Publication No. 10-2018-0055511, the measuring unit includes a first measuring unit and a second measuring unit. The first measuring unit is disposed above the container, and the second measuring unit is disposed on the side of the container. The first measuring unit and the second measuring unit may be equipped with a camera, an infrared sensor, an ultrasonic sensor, a laser sensor, and the like.

However, in Korean Patent Application Publication No. 10-2018-0055511, the capacity is calculated and an amount of water to be taken out is controlled according to information from the first measuring unit and the second measuring unit. As a result, when there is an error in the information from the measuring unit, an inappropriate amount of water may be taken out.

Further, in Korean Patent Application Publication No. 10-2018-0055511, there is a shortcoming in that the user has to manually manipulate the water purifier when the measurement unit has measured the capacity of the container incorrectly. An artificial intelligence technology that analyzes a shape of an object by automatically recognizing an image photographed by the camera has some degree of error. Measured values of the infrared sensor, the ultrasonic sensor, and the laser sensor also have a degree of error.

In Korean Patent Application Publication No. 10-2018-0055511, a first measurement value represents the width of the container and a second measurement value represents the height of the container. Thus, the capacity of the container may be calculated through multiplication of the first measurement value and the second measurement value. However, since both the first measurement value and the second measurement value involve a degree of error, the multiplication of the first measurement value and the second measurement value may involve a degree of error that cannot be disregarded. Thus, in Korean Patent Application Publication No. 10-2018-0055511, the shortcoming in which the amount of water to be taken out and the capacity of the container in which water is contained may not precisely match each other may not be fundamentally solved.

Recently, the convenience of life has increased due to the launch of home appliances using artificial intelligence technology. The applicant of the present disclosure has studied a control method of a water purifier that communicates with a user by using artificial intelligence technology in order to fundamentally solve the above-described shortcomings of the related art.

3. Related Art Documents

Korean Patent Application Publication No. 10-2019-0040949 (Publication date: Apr. 19, 2019)

Korean Patent Application Publication No. 10-2018-0055511 (Publication date: May 25, 2018)

SUMMARY OF THE DISCLOSURE

The present disclosure is directed to providing a water purifier and a control method thereof, which are configured to discharge water at an appropriate temperature and amount by automatically recognizing a container and content contained therein, even when a user mistakenly inputs a water temperature and an amount of water.

In addition, the present disclosure is further directed to providing a water purifier and a control method thereof, which are configured to discharge water at the appropriate temperature and amount by reducing errors in detecting the container and the content contained therein.

Further, the present disclosure is still further directed to providing a water purifier and a control method thereof, which are configured such that even when a selected discharge amount of water exceeds a capacity of the container or a continuous water discharge request is inputted and then not stopped, discharged water does not overflow the container.

Furthermore, the present disclosure is still further directed to providing a water purifier and a control method thereof, which are configured to accurately discharge a relative amount of water based on the capacity of the container.

Furthermore, the present disclosure is still further directed to providing a water purifier and a control method thereof, which are configured to discharge water at a temperature and amount that matches the capacity of the container and the content contained therein, by bidirectional communication with the user.

A water purifier according to an embodiment of the present disclosure may include a main body, a camera, a distance sensor, and a control unit.

In the water purifier according to this embodiment of the present disclosure, the distance sensor may generate lowest point height information and highest point height information on a container before water is discharged, and generate real-time height information on a water surface after the water is discharged, and the control unit may stop discharging the water before a real-time height exceeds the highest point height.

The main body forms a seating surface on which the container is placed. The main body is capable of discharging the water into the container placed on the seating surface.

The camera and the distance sensor are installed vertically over the seating surface on the main body. The camera and the distance sensor may face the seating surface.

The camera may be configured to photograph the seating surface to generate real-time image information.

The control unit may control operations of the main body, the camera, and the distance sensor.

The seating surface may be provided with two or more markers.

The control unit may store relative coordinates of the two or more markers.

The camera may photograph the seating surface to generate the real-time image information before the water is discharged.

The control unit may be configured to compare at least one of reference image information on the container or reference image information on the content with the real-time image information, and to control a discharge amount of water according to the comparison result.

The control unit may calculate area information on the container based on the relative coordinates of the container and the plurality of markers in the real-time image information.

In a control method of the water purifier according to an embodiment of the present disclosure, when a water discharging step is initiated, the distance sensor may generate the real-time height information on the water surface and stop discharging water before the real-time height exceeds the highest point height.

A control method of the water purifier according to an embodiment of the present disclosure may include a photographing step, a scanning step, a recognizing step, a calculating step, a determining step, and a water discharging step.

The photographing step may be a step of photographing, by the camera, the seating surface to generate the real-time image information when water discharge information including water temperature information is inputted.

The scanning step may be a step of scanning, by the distance sensor, the seating surface to generate real-time distance information.

The recognizing step may be a step of recognizing the container and the content by comparing the real-time image information with the reference image information.

The calculating step may be a step of analyzing the real-time image information and the real-time distance information to generate the capacity information on the container.

The determining step may be a step of determining whether the water temperature information matches the reference water discharge information.

The reference image information may be information on image data obtained by photographing various containers or contents from above.

The reference water discharge information may be information on the temperature or amount of water corresponding to the various containers or contents.

The water discharging step may be a step of discharging the water according to the water discharge information when the water temperature information matches the reference water discharge information.

The real-time distance information includes the lowest point height information and the highest point height information on the container.

When, at the determining step, the water temperature information does not match the reference water discharge information, a confirmation request signal may be outputted.

The seating surface may be provided with the two or more markers.

The control unit may store the relative coordinates of the two or more markers.

The calculating step may include a first calculating step, a second calculating step, and a third calculating step.

The first calculating step may be a step of calculating the area information on the container based on the relative coordinates of the container and the plurality of markers in the real-time image information.

The second calculating step may be a step of calculating the height information on the container using the lowest point height information and the highest point height information.

The third calculating step may be a step of generating the capacity information on the container using the area information and the height information.

Furthermore, a control method of the water purifier according to an embodiment of the present disclosure may include a photographing step, a scanning step, a recognizing step, a calculating step, and a water discharging step.

The photographing step may be a step of photographing, by the camera, the seating surface to generate the real-time image information when the water discharge information including the water temperature information is inputted.

The scanning step may be a step of scanning, by the distance sensor, the seating surface to generate the real-time distance information.

The recognizing step may be a step of recognizing the container and the content, by comparing the real-time image information with the reference image information.

The calculating step may be a step of analyzing the real-time image information and the real-time distance information to generate the capacity information on the container.

The water discharging step may be a step of discharging the water according to the reference water discharge information instead of the water discharge information.

The real-time distance information may include the lowest point height information and the highest point height information on the container.

Furthermore, in the control method of the water purifier according to this embodiment of the present disclosure, the reference image information and the reference water discharge information may be updated to include the real-time image information, the real-time distance information, and the water discharge information.

A control method of the water purifier according to an embodiment of the present disclosure may include a photographing step, a scanning step, a recognizing step, a determining step, a water discharging step and an updating step.

The photographing step may be a step of photographing, by the camera, the seating surface to generate the real-time image information when the water discharge information including the water temperature information is inputted.

The scanning step may be a step of scanning, by the distance sensor, the seating surface to generate the real-time distance information.

The recognizing step may be a step of comparing the real-time image information with the reference image information to determine whether the container and the content are recognized.

The determining step may be a step of determining whether the water temperature information matches the reference water discharge information, when the container and the content are recognized.

The water discharging step may be a step of discharging the water according to the water discharge information when the water temperature information matches the reference water discharge information.

The updating step may be a step of updating the reference image information and the reference water discharge information to include the real-time image information, the real-time distance information, and the water discharge information.

At the recognizing step, when the container and the content are not recognized, the confirmation request signal may be outputted.

When, at the determining step, the water temperature information does not match the reference water discharge information, the confirmation request signal may be outputted.

Furthermore, a control method of the water purifier according to an embodiment of the present disclosure may include a photographing step, a scanning step, a recognizing step, a water discharging step and an updating step.

The photographing step may be a step of photographing, by the camera, the seating surface to generate the real-time image information when the water discharge information including the water temperature information is inputted.

The scanning step may be a step of scanning, by the distance sensor, the seating surface to generate the real-time distance information.

The recognizing step may be a step of comparing the real-time image information with the reference image information to determine whether the container and the content are recognized.

The water discharging step may be a step of discharging the water according to the reference water discharge information instead of the water discharge information, when the container and the content are recognized.

The updating step may be a step of updating the reference image information and the reference water discharge information to include the real-time image information, the real-time distance information, and the water discharge information.

At the recognizing step, when the container and the content are not recognized, the confirmation request signal may be outputted.

Furthermore, the control method of the water purifier according to this embodiment of the present disclosure may learn the real-time image information, the real-time distance information, and the capacity information on the container.

A control method of the water purifier according to an embodiment of the present disclosure may include a photographing step, a scanning step, a calculating step, and an updating step.

The photographing step may be a step of photographing, by the camera, the seating surface to generate the real-time image information on the container.

The scanning step may be a step of scanning, by the distance sensor, the seating surface to generate the real-time distance information on the container.

The calculating step may be a step of analyzing the real-time image information and the real-time distance information to generate the capacity information on the container.

The updating step may be a step of updating the reference image information and the reference water discharge information to include the real-time image information, the real-time distance information, and the capacity information.

Furthermore, a computer program according to an embodiment of the present disclosure may be stored in a computer-readable recording medium in order to cause a computer to execute the control method of the water purifier.

According to an embodiment of the present disclosure, by sequentially performing the steps of generating real-time image information and real-time distance information, comparing the real-time image information with reference image information, generating capacity information on a container, determining whether water discharge information matches reference water discharge information, and comparing real-time height information with highest point height information, it is possible to provide a water purifier and a control method thereof, which are configured such that even though a selected discharge amount of water exceeds a capacity of the container or a continuous water discharging request is inputted and then not stopped, discharged water does not overflow the container.

According to an embodiment of the present disclosure, by sequentially performing the steps of generating real-time image information and real-time distance information, comparing the real-time image information with reference image information, determining whether water discharge information matches reference water discharge information, and updating the reference image information and reference water discharge information, it is possible to provide a water purifier and a control method thereof, which are configured to discharge water at an appropriate temperature and amount by automatically recognizing a container and content contained therein, even when the user mistakenly inputs a water temperature and an amount of water.

According to an embodiment of the present disclosure, by updating reference image information and reference water discharge information to include real-time image information, real-time distance information, and capacity information each time a water purifier is used, it is possible to provide a water purifier and a control method thereof, which are configured to accurately discharge an absolute and relative amount of water based on a capacity of a container, a type, and amount of content.

Further, according to an embodiment of the present disclosure, by bi-directionally communicating with a user through a voice input unit and a voice output unit, in the process of inputting water discharge information, comparing real-time image information with reference image information, and determining whether the water discharge information matches reference water discharge information, it is possible to provide a water purifier and a control method thereof, which are configured to discharge water at a temperature and amount that matches a capacity of a container, and content contained therein.

DETAILED DESCRIPTION

Figure 1:
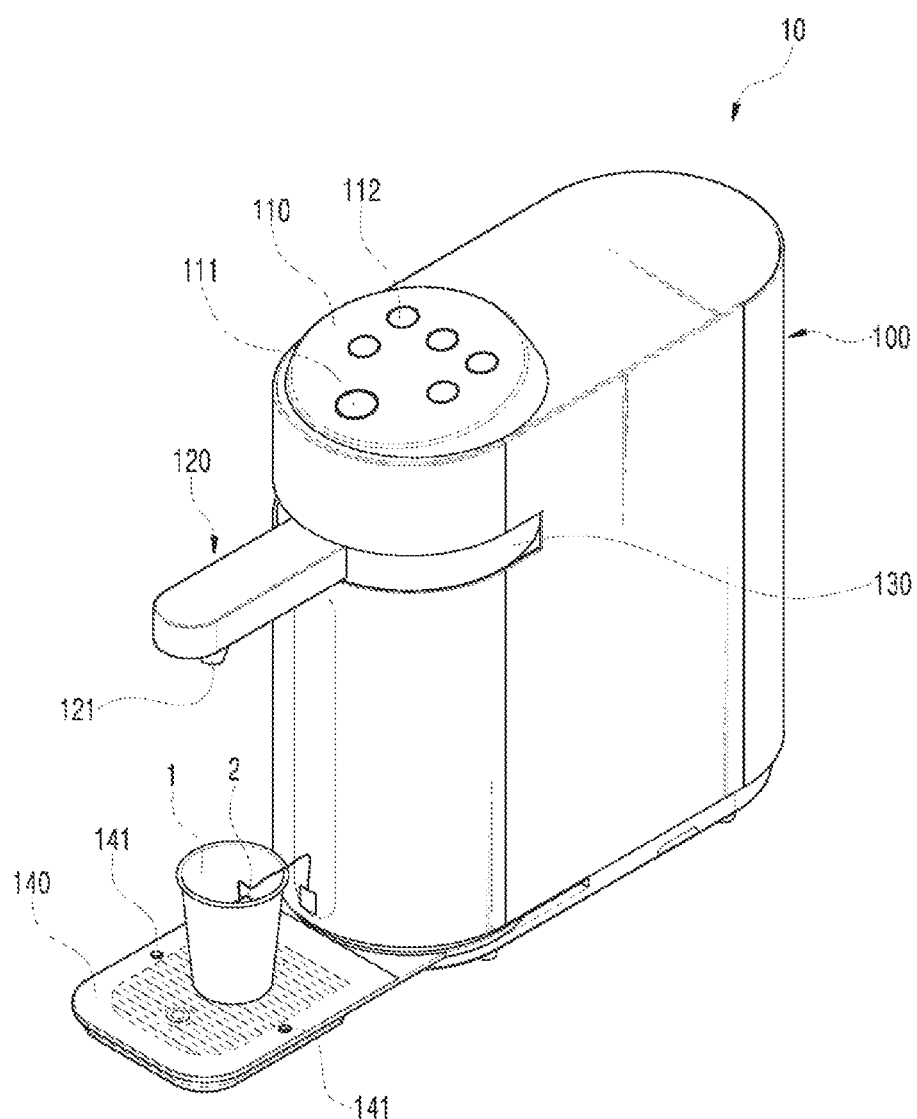
FIG. 1 is a perspective view of a water purifier according to an embodiment of the present disclosure.

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure.

The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, or components, but do not preclude the presence or addition of one or more other features, integers, steps, operations, elements, components, or groups thereof. Furthermore, the terms such as "first," "second," and other numerical terms may be used herein only to describe various elements, but these elements should not be limited by these terms. Furthermore, these terms such as "first," "second," and other numerical terms, are used only to distinguish one element from another element.

Hereinbelow, the example embodiments of the present disclosure will be described in greater detail with reference to the accompanying drawings, and on all these accompanying drawings, the identical or analogous elements are designated by the same reference numeral, and repeated description of the common elements will be omitted.

Figure 2:
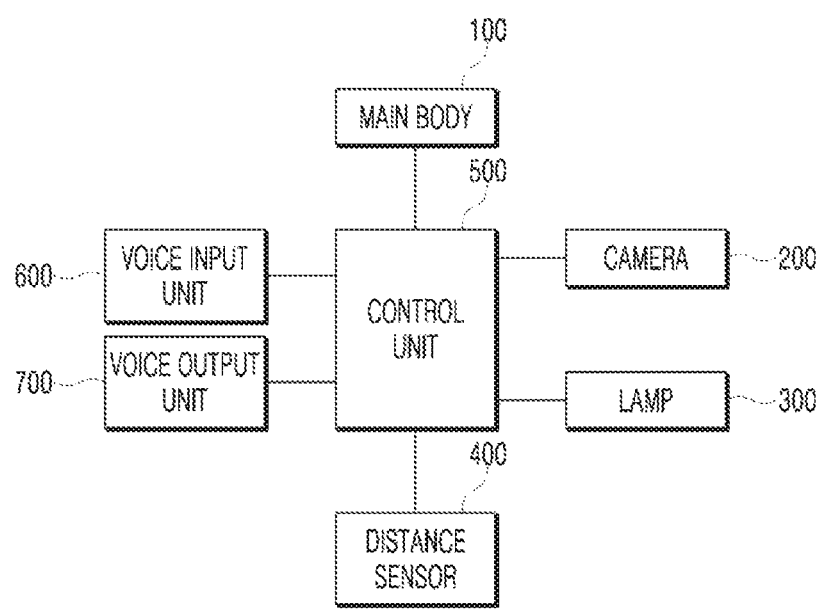
FIG. 2 is a schematic view of the water purifier of FIG. 1.
Figure 3:
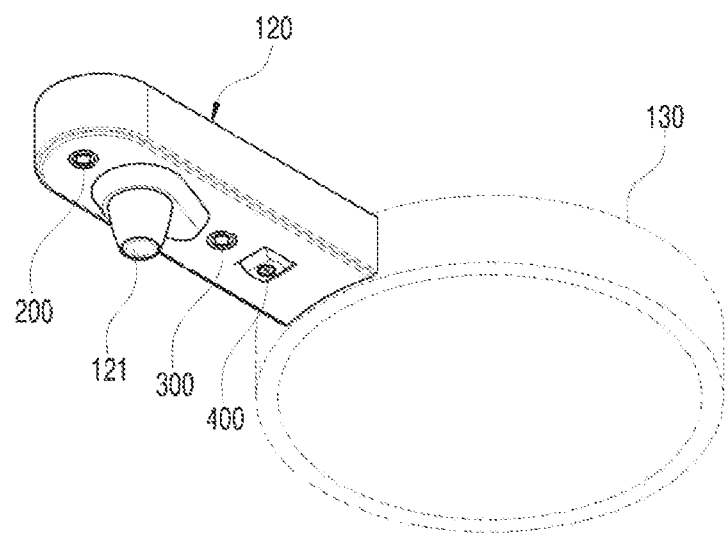
FIG. 3 is a bottom perspective view illustrating a water discharge port of the water purifier of FIG. 1.
Figure 4:
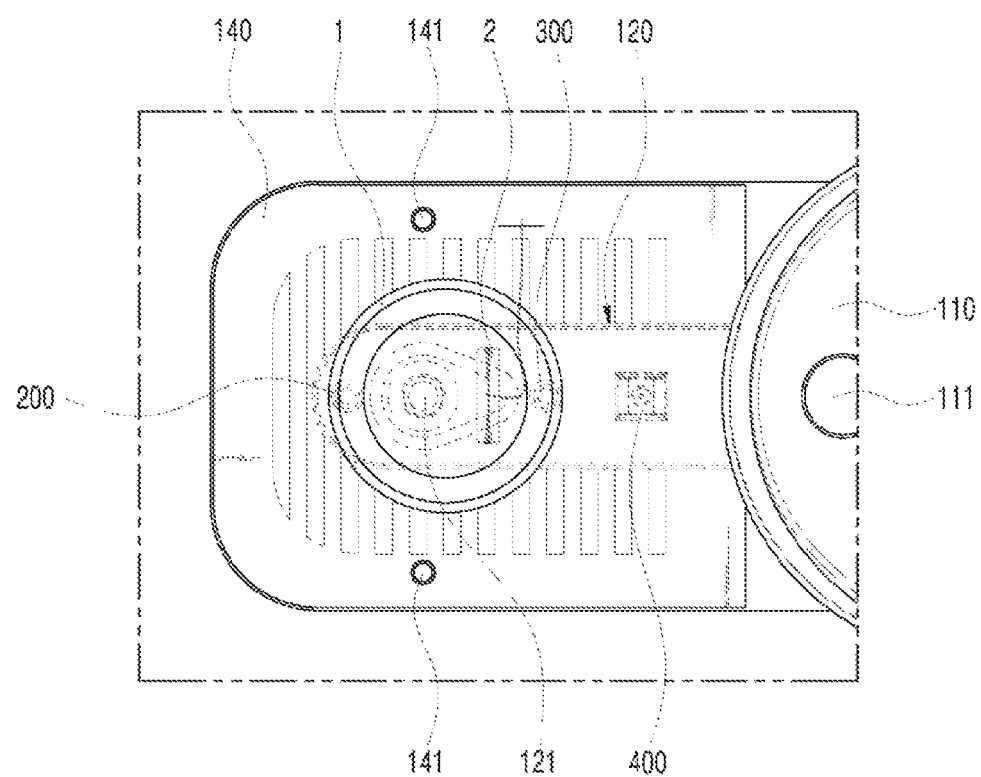
FIG. 4 is a partial top view of the water purifier of FIG. 1.

FIG. 1 is a perspective view of a water purifier 10 according to an embodiment of the present disclosure, FIG. 2 is a schematic view of the water purifier 10 of FIG. 1, FIG. 3 is a bottom perspective view illustrating a water discharge part 120 of the water purifier 10 of FIG. 1, and FIG. 4 is a partial plan view of the water purifier 10 of FIG. 1.

As shown in FIGS. 1 to 4, the water purifier 10 according to an embodiment of the present disclosure is configured to discharge water into a container 1 in which content is contained.

The water purifier 10 according to this embodiment of the present disclosure is a device configured to recognize the container 1 and the content 2 and to discharge water, and includes a main body 100, a camera 200, a lamp 300, a distance sensor 400, and a control unit 500.

The main body 100 is configured to discharge water into the container 1. On an upper portion of the main body 100 is formed a manipulation part 110. The user manipulates a manipulation button 112 and a water discharge button 111 that are formed in the manipulation part 110 to discharge hot water or cold water.

The user may press the manipulation button 112 to input water discharge information (S111). The water discharge information includes temperature information and amount information on the water to be discharged. When the water discharge button 111 is pressed, a set temperature and amount of water is discharged through a nozzle 121. As an example, the inputted water discharge information may be 40° C. and 120 ml.

The water discharge information may be inputted by a user's voice. As an example, the user's voice may be "Puricare, make me hot coffee," or "Puricare, pour me only half a glass of hot water." As shown in FIG. 2, the control unit 500 may be connected to a voice input unit 600. The voice input unit 600 may receive voice recognition target words from a user and generate voice data. The control unit 500 analyzes the voice data to generate the water discharge information. The control unit 500 may discharge the water according to the generated water discharge information.

The control unit 500 may be connected to a voice output unit 700. The voice output unit 700 may receive the voice data from the control unit 500 and output voice. As disclosed in Korean Patent Application Publication No. 10-2017-0072064, the water purifier 10 that discharges the water according to the user' voice is a well-known technology, so a detailed description thereof will be omitted.

The main body 100 may be implemented as the water purifier disclosed in Korean Patent Application Publication No. 10-2019-0040949. Korean Patent Application Publication No. 10-2019-0040949 is an application filed by the applicant of the present invention. The main body 100 may be implemented as a conventional water purifier that is not capable of automatically recognizing the container 1 and the content 2.

As shown in FIGS. 3 and 4, on the main body 100 are formed the water discharge part 120 and a seating surface 140. The nozzle 121, the camera 200, the lamp 300, and the distance sensor 400 are installed in the water discharge part 120. The nozzle 121, the camera 200, the lamp 300 and the distance sensor 400 are provided vertically over the seating surface 140 and face downward, that is, face the seating surface 140.

The nozzle 121 is a part that discharges water. The seating surface 140 is a part on which the container 1 is placed. The seating surface 140 is provided under the water discharge part 120. As shown in FIG. 4, the container 1 is placed below the nozzle 121 on the seating surface 140. Referring to Korean Patent Application Publication No. 10-2019-0040949, the water discharge part 120 may be coupled to a rotator 130.

Figure 5:
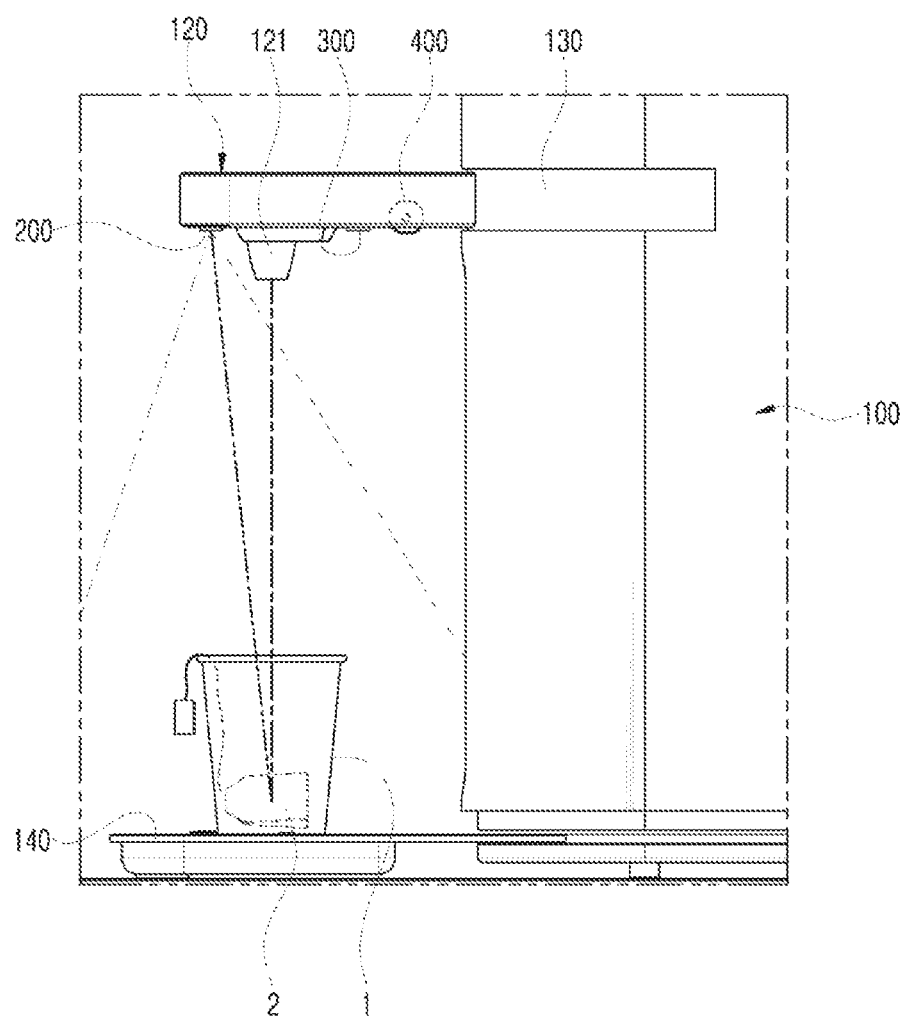
FIG. 5 is a partial side view illustrating a situation in which a camera of the water purifier of FIG. 1 generates real-time image information.
Figure 6:
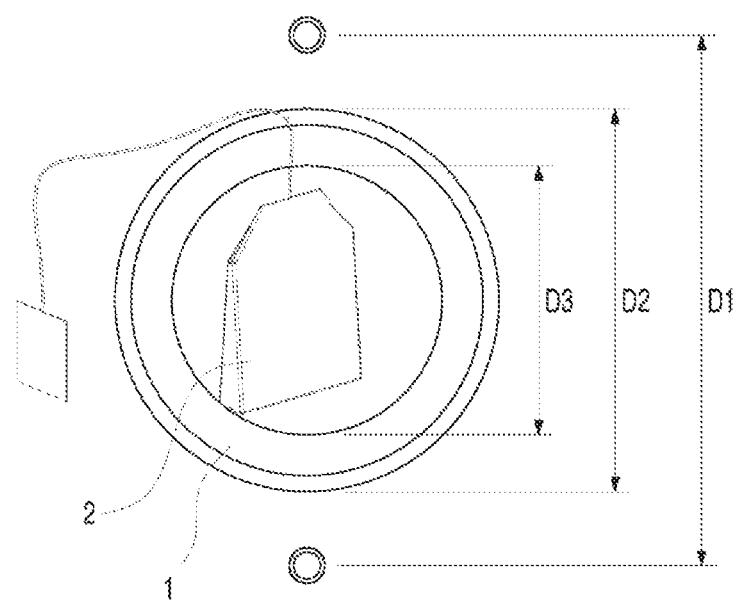
FIGS. 6 and 7 are views illustrating real-time image information generated by the camera of the water purifier of FIG. 1.
Figure 7:
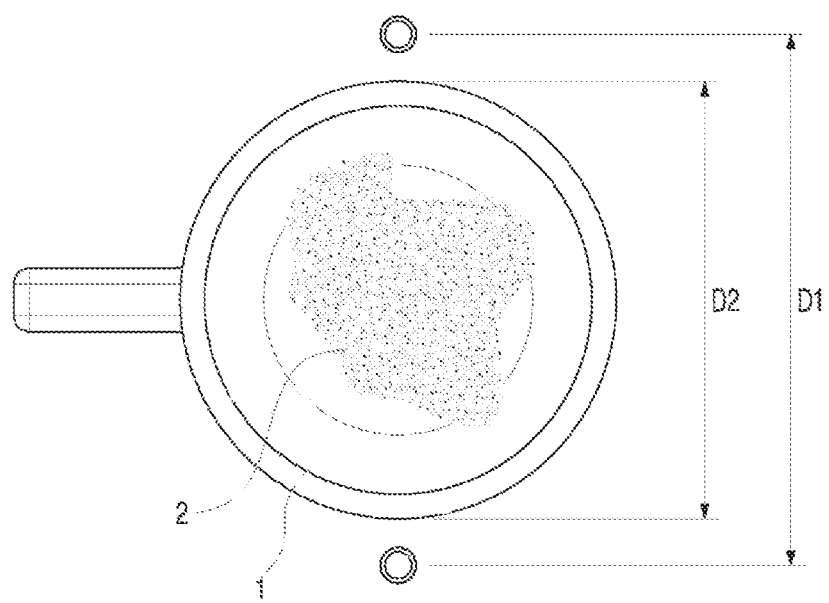

FIG. 5 is a partial side view illustrating a situation in which the camera 200 of the water purifier 10 of FIG. 1 generates real-time image information, and FIGS. 6 and 7 are views illustrating the real-time image information generated by the camera 200 of the water purifier 10 of FIG. 1.

As shown in FIG. 5, the camera 200 is a part for photographing the seating surface 140 to generate the real-time image information (S112). The lamp 300 illuminates the seating surface 140 during operation of the camera 200. A one-dot chain line in FIG. 5 is a virtual line extending from the nozzle 121 in the direction of gravity. A dotted line in FIG. 5 represents a range in which the camera 200 photographs. A two-dot chain line in FIG. 5 represents the center of the range in which the camera 200 photographs.

As shown in FIG. 4, on the seating surface 140 are formed two or more markers 141. The two or more markers 141 form reference coordinates for measuring the size of the container 1 in the real-time image information. The control unit 500 stores relative coordinates of the two or more markers 141. The markers 141 differ in color, lightness, or saturation from the seating surface 140.

As shown in FIGS. 6 and 7, the real-time image information includes image information on the container 1, the content 2, and the markers 141. The control unit 500 may calculate area information on the container 1 and the content 2 by analyzing relative coordinates of the container 1, the content 2, and the markers 141. FIG. 6 illustrates image information on a paper cup and a tea bag. FIG. 7 illustrates image information on a mug and instant coffee.

As shown in FIG. 1, the control unit 500 is provided inside the main body 100. The control unit 500 controls operations of the main body 100, the camera 200, the lamp 300, and the distance sensor 400.

Herein, the control unit 500 may include all kinds of devices capable of processing data, such as a processor. Here, 'the processor' may, for example, refer to a data processing device embedded in hardware, which has physically structured circuitry to perform a function represented by codes or instructions contained in a program.

As one example of the data processing device embedded in the hardware, a microprocessor, a central processing unit (CPU), a processor core, a multiprocessor, an application-specific integrated circuit (ASIC), a field programmable gate array (FPGA), and the like may be included, but the scope of the present disclosure is not limited thereto.

In the present embodiment, the water purifier 10 may perform machine learning such as deep learning, in order to generate capacity information on the container 1, determine whether water temperature information matches reference water discharge information, recognize the container 1 and the content 2, and update reference image information and the reference water discharge information.

The water purifier 10 may include a storage unit. The storage unit may store data used for the machine learning, result data, and the like. In addition, the storage unit may perform a function of temporarily or permanently storing the data processed by the control unit 500.

Herein, the storage unit may include magnetic storage media or flash storage media, but the scope of the present disclosure is not limited thereto. The storage unit may include an internal memory or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Meanwhile, the artificial neural network can be trained by adjusting connection weights between nodes (if necessary, adjusting bias values as well) so as to produce desired output from given input. Also, the artificial neural network can continuously update the weight values through learning. Furthermore, methods such as back propagation may be used in training the artificial neural network.

In addition, the water purifier 10 may be equipped with an artificial neural network, and may perform machine learning based steps, in order to generate the capacity information on the container 1, determine whether the water temperature information matches the reference water discharge information, recognize the container 1 and the content 2, and update the reference image information and the reference water discharge information.

The control unit 500 may include an artificial neural network, for example, a deep neural network (DNN) and train the DNN, and examples of the DNN include CNN, RNN, DBN, and so forth. As a machine learning method for such an artificial neural network, both unsupervised learning and supervised learning may be used.

The control unit 500 stores the reference image information and the reference water discharge information on each of the container 1 and the content 2. The reference image information represents image data obtained by photographing various containers 1 or contents 2 from above.

The reference water discharge information represents the temperature or the amount of water corresponding to the various containers 1 or the contents 2. As an example, the reference water discharge information corresponding to the image information on the paper cup and the tea bag may represent hot water of 85° C. and 130 ml. As an example, the reference water discharge information corresponding to the image information on the mug and the instant coffee may represent hot water of 90° C. and 200 ml.

Figure 8:
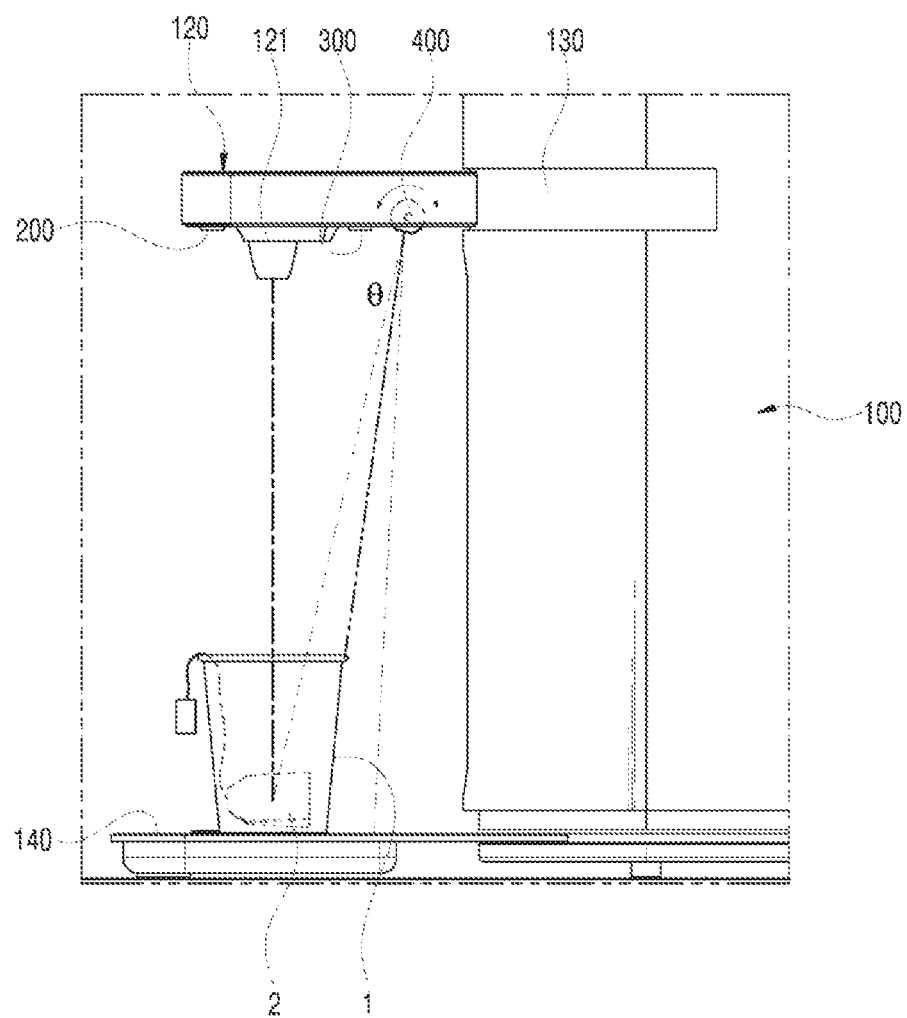
FIG. 8 is a partial side view illustrating a situation in which a distance sensor of the water purifier of FIG. 1 generates real-time distance information.
Figure 9:
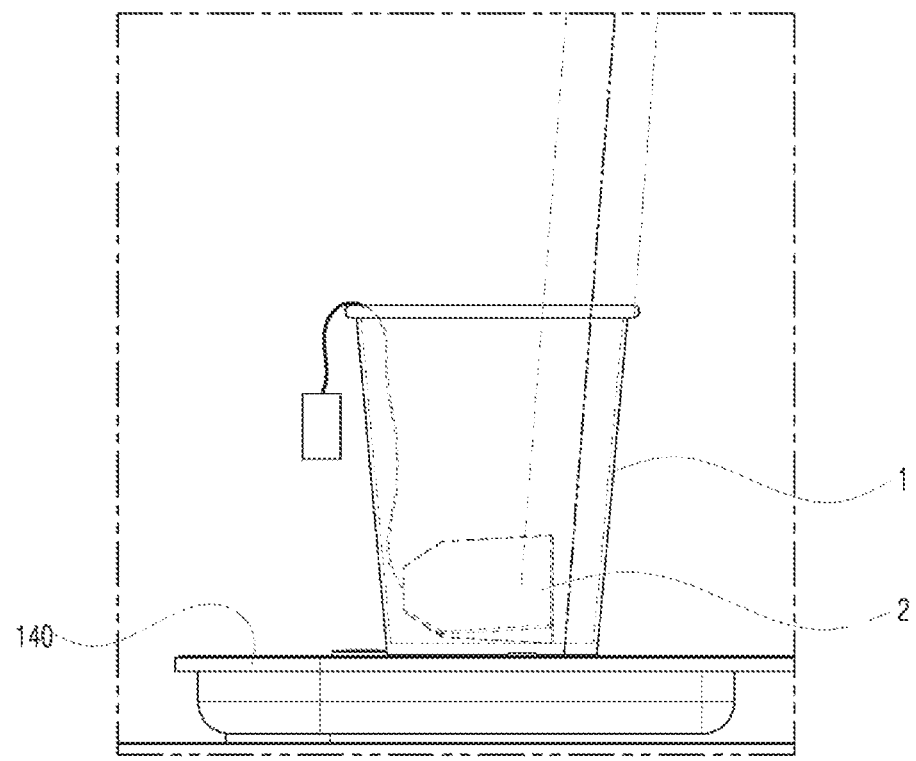
FIG. 9 is a partially enlarged view of FIG. 8.
Figure 10:
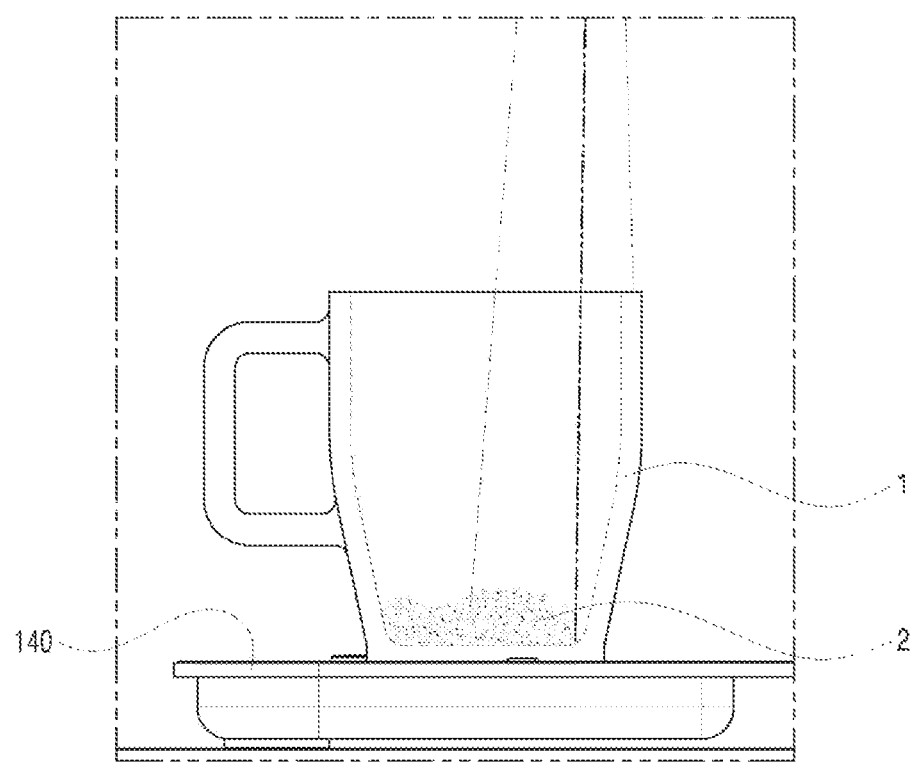
FIG. 10 is a partial side view illustrating a situation in which the distance sensor of the water purifier of FIG. 1 generates the real-time distance information.

FIG. 8 is a partial side view illustrating a situation in which the distance sensor 400 of the water purifier 10 of FIG. 1 generates real-time distance information, FIG. 9 is a partial enlarged view of FIG. 8, and FIG. 10 is a partial side view illustrating a situation in which the distance sensor 400 of the water purifier 10 of FIG. 1 generates the real-time distance information.

As shown in FIG. 8, the distance sensor 400 is a part for scanning the seating surface 140 to generate the real-time distance information. The distance sensor 400 may be a laser sensor, an ultrasonic sensor, and the like. The distance sensor 400 is rotatably installed in the water discharge part 120. The distance sensor 400 is rotated by an angle of θ by a step motor. The control unit 500 controls the operation of the step motor.

A one-dot chain line in FIG. 8 is a virtual line extending from the nozzle 121 in the direction of gravity. A dotted line in FIG. 8 represents a range in which the distance sensor 400 scans. The distance sensor 400 generates the real-time distance information indicating the distance from the inside to the outside of the container 1 while being rotated by the angle of θ by the step motor. A two-dot chain line in FIG. 8 represents that the distance sensor 400 measures the highest point height of the container 1.

As shown in FIGS. 9 and 10, the real-time distance information may include lowest point height information and highest point height information on the container 1. A two-dot chain line in FIGS. 9 and 10 represents that the distance sensor 400 measures the lowest point height of the container 1. A one-dot chain line in FIGS. 9 and 10 represents that the distance sensor 400 measures the highest point height of the container 1. A dotted line in FIGS. 9 and 10 represents that the distance sensor 400 measures the highest point height of the content 2.

Figure 11:
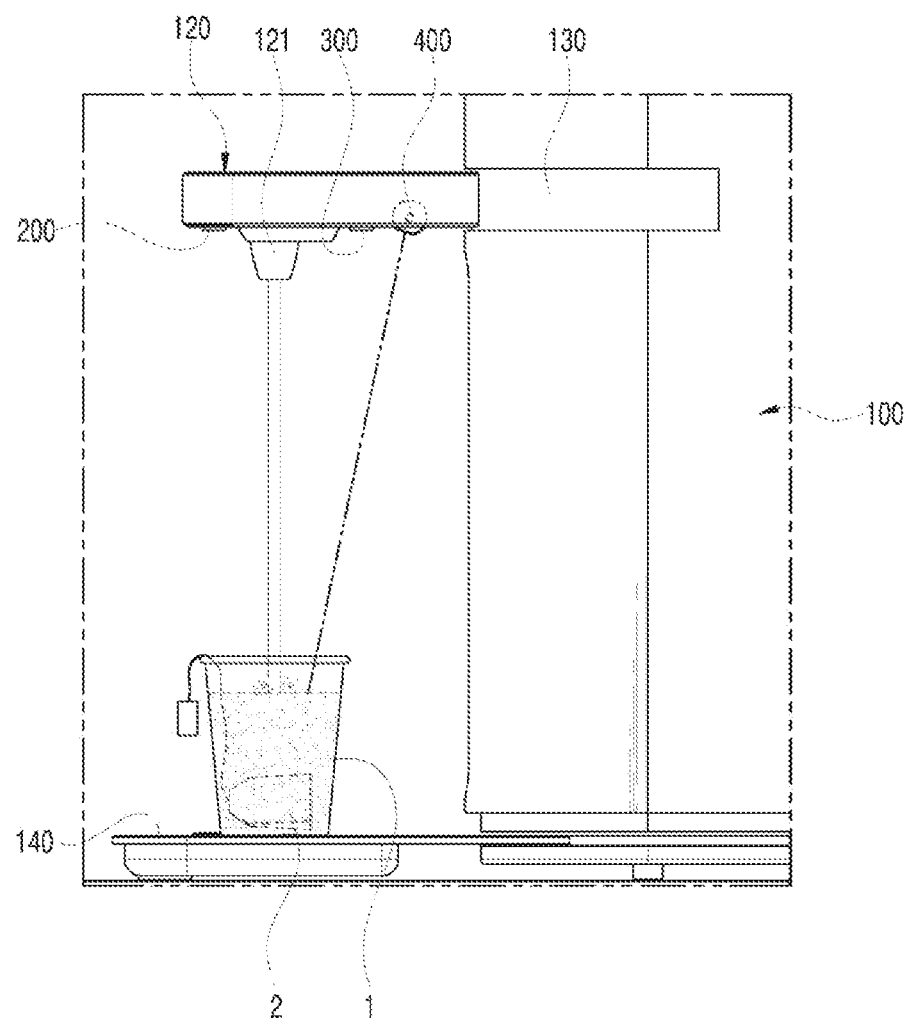
FIG. 11 is a partial side view illustrating a situation in which the distance sensor of the water purifier of FIG. 1 generates real-time height information.

FIG. 11 is a partial side view illustrating a situation in which the distance sensor 400 of the water purifier 10 of FIG. 1 generates real-time height information.

As shown in FIG. 11, while water is discharged, the distance sensor 400 may generate real-time height information on a water surface.

The user may select a use mode of the water purifier 10 by pressing the manipulation button 112. The use mode may include a manual mode, an automatic mode, and a learning mode. The manual mode, the automatic mode, and the learning mode may be executed by a computer program. The computer program may be stored in a computer-readable recording medium in order to cause a computer to execute the manual mode, the automatic mode, and the learning mode.

The manual mode will be described in detail in a first embodiment and a third embodiment. The automatic mode will be described in detail in a second embodiment and a fourth embodiment. The learning mode will be described in detail in a fifth embodiment.

First Embodiment

Figure 12:
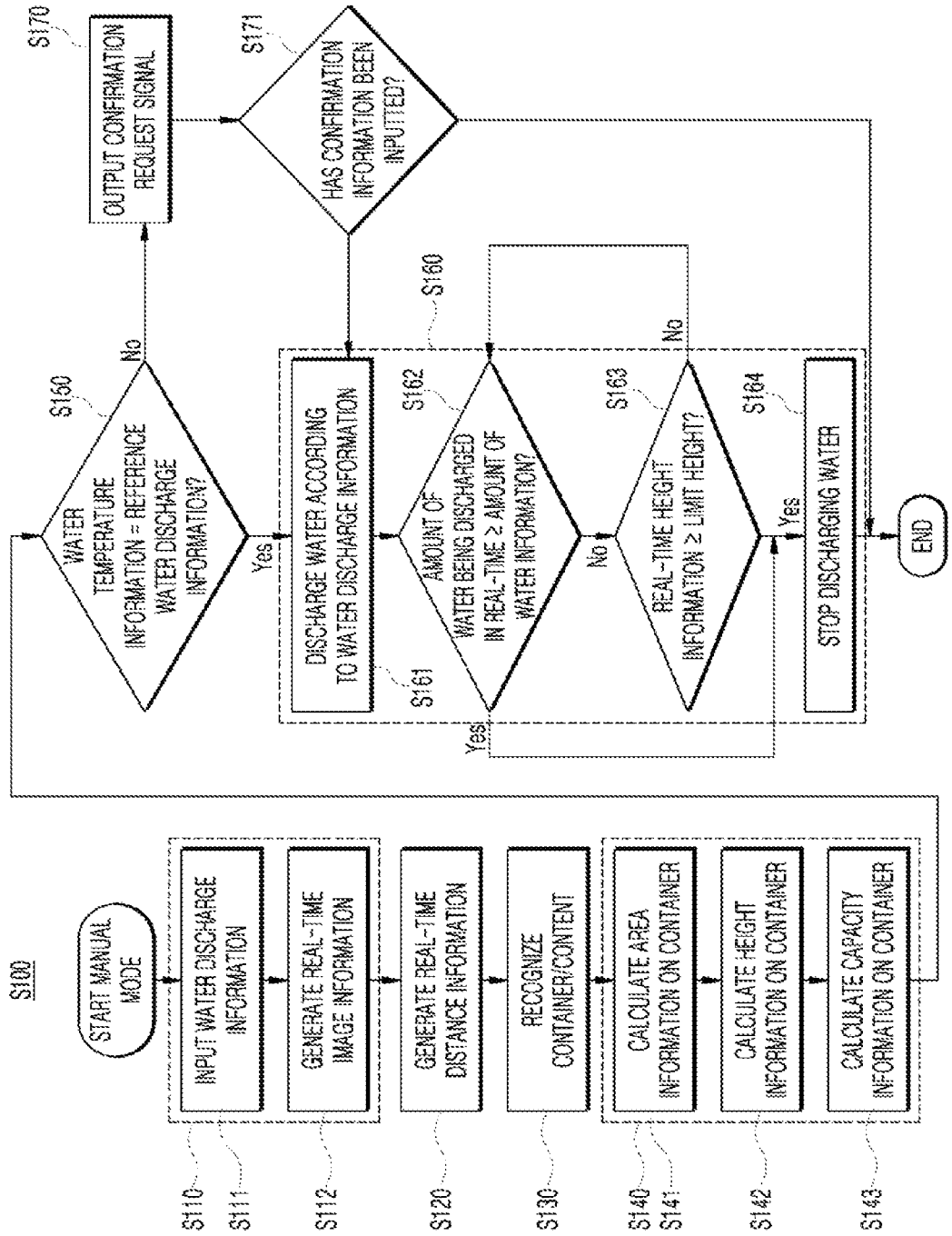
FIG. 12 is a flowchart of a control method of a water purifier according to an embodiment of the present disclosure.

FIG. 12 is a flowchart of a control method S100 of the water purifier 10 according to an embodiment of the present disclosure.

As shown in FIG. 12, the control method S100 of the water purifier 10 according to the embodiment of the present disclosure may include a photographing step S110, a scanning step S120, a recognizing step S130, a calculating step S140, a determining step S150, and a water discharging step S160.

The photographing step S110 is a step in which, when the water discharge information including the water temperature information is inputted (S111), the camera 200 photographs the seating surface 140 to generate the real-time image information (S112).

As shown in FIG. 1, the user may input the water discharge information by pressing the manipulation button 112 after placing the container 1 on the seating surface 140 (S111). The container 1 may be the paper cup in which the tea bag is contained. The water discharge information includes the temperature information and the amount information on the water to be discharged.

The user may input the water temperature information and amount of water information by pressing the manipulation button 112. The manipulation button may include a button for inputting the water temperature information and a button for inputting the amount of water information. As an example, the water temperature information and the amount of water information may be 40° C. and 120 ml.

The water discharge information may be inputted by the user's voice. As an example, the user's voice may be "Puricare, make me hot coffee," or "Puricare, pour me only half a glass of hot water."

As shown in FIGS. 5 to 7, when the water discharge information is inputted, the camera 200 photographs the seating surface 140 to generate the real-time image information (S112). As shown in FIG. 5, the camera 200 is a part for photographing the seating surface 140 to generate the real-time image information (S112). The lamp 300 illuminates the seating surface 140 during the operation of the camera 200.

The one-dot chain line in FIG. 5 is a virtual line extending from the nozzle 121 in the direction of gravity. The dotted line in FIG. 5 represents the range in which the camera 200 photographs. The two-dot chain line in FIG. 5 represents the center of the range in which the camera 200 photographs.

As shown in FIGS. 6 and 7, the real-time image information includes the image information on the container 1, the content 2, and the markers 141. FIG. 6 illustrates the image information on the paper cup and the tea bag. FIG. 7 illustrates the image information on the mug and the instant coffee.

As shown in FIG. 12, when the photographing step S110 is completed, the scanning step S120 is initiated. The scanning step S120 is a step of scanning, by the distance sensor 400, the seating surface 140 to generate the real-time distance information.

As shown in FIG. 8, the distance sensor 400 is a part for scanning the seating surface 140 to generate the real-time distance information. The distance sensor 400 may be a laser sensor, an ultrasonic sensor, and the like. The distance sensor 400 is rotatably installed in the water discharge part 120. The distance sensor 400 is rotated by the angle of θ by the step motor. The control unit 500 controls the operation of the step motor.

The one-dot chain line in FIG. 8 is a virtual line extending from the nozzle 121 in the direction of gravity. The dotted line in FIG. 8 represents the range in which the distance sensor 400 scans. The distance sensor 400 generates the real-time distance information indicating the distance from the inside to the outside of the container 1 while being rotated by the angle of θ by the step motor. The two-dot chain line in FIG. 8 represents that the distance sensor 400 measures the highest point height of the container 1.

As shown in FIG. 12, when the scanning step S120 is completed, the recognizing step S130 is initiated. The recognizing step S130 is a step of recognizing the container 1 and the content 2 by comparing the real-time image information with the reference image information. The reference image information represents the image data obtained by photographing the various containers 1 or contents 2 from above.

As shown in FIGS. 6 and 7, the real-time image information includes the image information on the container 1, the content 2, and the markers 141. FIG. 6 illustrates the image information on the paper cup and the tea bag. FIG. 7 illustrates the image information on the mug and the instant coffee.

The reference image information may include the image information on the paper cup, the mug, the tea bag, and the instant coffee. As an example, at the recognizing step S130, the control unit 500 may recognize the paper cup as the container 1 and may recognize the tea bag as the content 2.

The control unit 500 selects, among the stored reference image information, reference image information that has high similarity to the real-time image information, through an image recognition technology using convolution neural network (CNN) based deep-learning. Since the image recognition technology using the convolution neural network is a well-known technology such as GoogLeNet and ResNet, a detailed description thereof will be omitted.

As shown in FIG. 12, when the recognizing step S130 is completed, the calculating step S140 is initiated. The calculating step S140 is a step of analyzing the real-time image information and the real-time distance information in order to generate the capacity information on the container 1. The calculating step S140 includes a first calculating step S141, a second calculating step S142, and a third calculating step S143.

The first calculating step S141 is a step of calculating the area information on the container 1 and the content 2 based on relative coordinates of the container 1, the content 2, and the plurality of markers 141 in the real-time image information.

As shown in FIGS. 6 and 7, on the seating surface 140 are formed the two or more markers 141. The two or more markers 141 form reference coordinates for measuring the size of the container 1 in the real-time image information. The control unit 500 stores the relative coordinates, the relative distance, and the absolute distance between the two or more markers 141. The markers 141 differ in color, lightness, or saturation from the seating surface 140.

The real-time image information includes the image information on the container 1, the content 2, and the markers 141. The control unit 500 calculates the area information on the container 1 and the content 2 by analyzing the relative coordinates of the container 1, the content 2, and the markers 141.

As shown in FIGS. 5 and 6, the real-time image information includes the relative distance D1 between two or more markers 141, the diameter D2 of the outer periphery of the container 1, and the diameter D3 of a bottom surface inside the container 1. As an example, the control unit 500 may calculate the area information on the container 1 by using D2. The control unit 500 may calculate the area information on the content 2 based on D1.

The second calculating step S142 is a step of calculating the height information on the container 1 using the lowest point height information and the highest point height information on the container 1.

As shown in FIGS. 9 and 10, the real-time distance information may include the lowest point height information and the highest point height information on the container 1. The control unit 500 may calculate the height of the inside of the container 1 using the difference between the highest point height and the lowest point height of the container 1.

The two-dot chain line in FIGS. 9 and 10 represents that the distance sensor 400 measures the lowest point height of the container 1. The one-dot chain line in FIGS. 9 and 10 represents that the distance sensor 400 measures the highest point height of the container 1. The dotted line in FIGS. 9 and 10 represents that the distance sensor 400 measures the highest point height of the content 2.

The third calculating step S143 is a step of generating the capacity information on the container 1 using the area information and the height information.

The control unit 500 may generate the capacity information on the container 1 as the product of the area and the highest point height of the container 1. In addition, the control unit 500 may generate the capacity information on the content 2 as the product of the area and the highest point height of the content 2.

As shown in FIG. 12, when the calculating step S140 is completed, the determining step S150 is initiated. The determining step S150 is a step of determining whether the water temperature information and the amount of water information match the reference water discharge information.

As an example, the inputted water discharge information may be 85° C. and 130 ml. At the recognizing step S130, the control unit 500 may recognize the paper cup as the container 1 and recognize the tea bag as the content 2. The reference water discharge information corresponding to the image information on the paper cup and the tea bag may be 85° C. and 130 ml.

As shown in FIG. 12, when, at the determining step S150, the water temperature information and the amount of water information match the reference water discharge information, the water discharging step S160 is initiated. When the water discharging step S160 is initiated, the control unit 500 discharges the water according to the water discharge information.

When discharging the water is initiated (S161), the distance sensor 400 generates the real-time height information on the water surface. Then, the control unit 500 continuously measures, by measuring an amount of water being discharged in real-time, whether the amount of water being discharged in real-time is equal to or greater than the amount of water information (S162). When the amount of water being discharged in real-time is equal to or greater than the amount of water information, the control unit 500 stops discharging the water (S164).

At the same time, the control unit 500 continuously determines whether the real-time height information is equal to or higher than a limit height (S163). As an example, the limit height may be set to a height of 90% of the highest point height of the container 1. When the real-time height information is equal to or higher than the limit height, the control unit 500 stops discharging the water (S164). That is, the control unit 500 stops discharging the water (S164) before a real-time height exceeds the highest point height.

As shown in FIG. 12, when, at the determining step S150, the water temperature information and the amount of water information do not match the reference water discharge information, the control unit 500 outputs the confirmation request signal (S170).

As an example, the inputted water discharge information may be 40° C. and 120 ml. At the recognizing step S130, the control unit 500 may recognize the paper cup as the container 1 and recognize the tea bag as the content 2. The reference water discharge information corresponding to the image information on the paper cup and the tea bag may represent hot water of 85° C. and 130 ml.

The confirmation request signal may be outputted as a voice (S170). The control unit 500 may be connected to the voice output unit 700. The voice output unit 700 may receive the voice data from the control unit 500 and output the voice. As an example, the voice data may be "Please check the temperature and the amount of the water."

The user may listen to the confirmation request signal and may input confirmation information (S171). When the user presses the water discharge button 111 (S171), the control unit 500 discharges the water according to the water discharge information (S161). When the user re-enters the water discharge information by pressing the manipulation button 112 and the water discharge button 111 (S171), the control unit 500 discharges the water according to the re-entered water discharge information (S161).

The confirmation information may be inputted by the user's voice (S171). As an example, the user's voice may be "Puricare, I have checked." The control unit 500 discharges the water according to the water discharge information (S161). As an example, the user's voice may be "Puricare, do it yourself." The control unit 500 discharges the water according to the reference water discharge information.

When the confirmation information is not inputted during a set time after the confirmation request signal is outputted (S170), the water is not discharged and the manual mode is ended.

Second Embodiment

Figure 13:
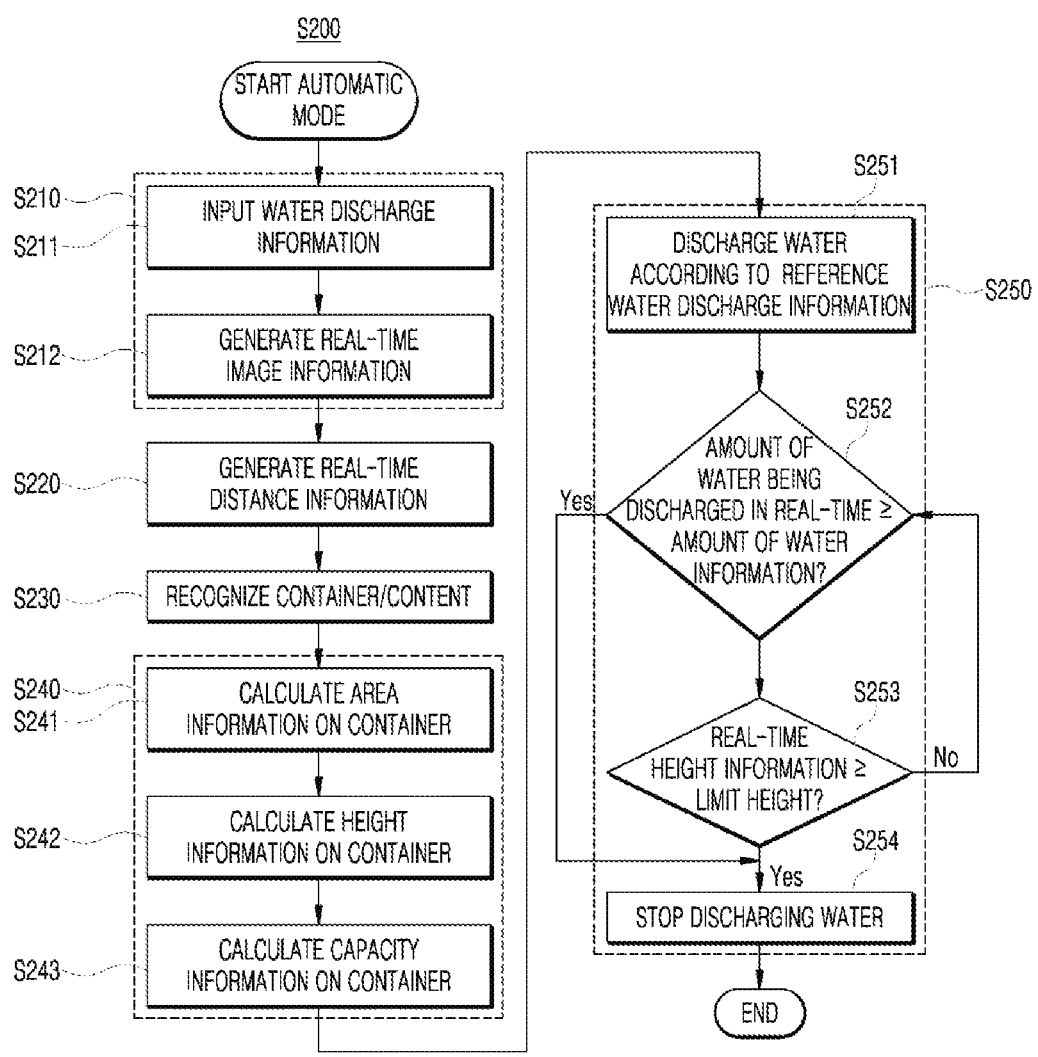
FIG. 13 is a flowchart of a control method of a water purifier according to another embodiment of the present disclosure.

FIG. 13 is a flowchart of a control method S200 of the water purifier 10 according to another embodiment of the present disclosure.

As shown in FIG. 13, the control method S200 of the water purifier 10 according to another embodiment of the present disclosure may include a photographing step S210, a scanning step S220, a recognizing step S230, a calculating step S240, and a water discharging step S250.

The photographing step S210 is a step in which, when the water discharge information including the water temperature information is inputted (S211), the camera 200 photographs the seating surface 140 to generate the real-time image information (S212).

As shown in FIG. 1, the user may input the water discharge information by pressing the manipulation button 112 after placing the container 1 on the seating surface 140 (S211). The container 1 may be the paper cup in which the tea bag is contained. The water discharge information includes the temperature information and the amount information on the water to be discharged.

The user may input the water temperature information and the amount of water information by pressing the manipulation button 112. As an example, the water temperature information and the amount of water information may be 40° C. and 120 ml. The water discharge information may be inputted by the user's voice. As an example, the user's voice may be "Puricare, make me hot coffee," or "Puricare, pour me only half a glass of hot water."

As shown in FIGS. 5 to 7, when the water discharge information is inputted, the camera 200 photographs the seating surface 140 to generate the real-time image information (S212). As shown in FIG. 5, the camera 200 is a part for photographing the seating surface 140 to generate the real-time image information (S212). The lamp 300 illuminates the seating surface 140 during the operation of the camera 200.

The one-dot chain line in FIG. 5 is a virtual line extending from the nozzle 121 in the direction of gravity. The dotted line in FIG. 5 represents the range in which the camera 200 photographs. The two-dot chain line in FIG. 5 represents the center of the range in which the camera 200 photographs.

As shown in FIGS. 6 and 7, the real-time image information includes the image information on the container 1, the content 2, and the markers 141. FIG. 6 illustrates the image information on the paper cup and the tea bag. FIG. 7 illustrates the image information on the mug and the instant coffee.

As shown in FIG. 13, when the photographing step S210 is completed, the scanning step S220 is initiated. The scanning step S220 is a step of scanning, by the distance sensor 400, the seating surface 140 to generate the real-time distance information.

As shown in FIG. 8, the distance sensor 400 is a part for scanning the seating surface 140 to generate the real-time distance information. The distance sensor 400 may be a laser sensor, an ultrasonic sensor, and the like. The distance sensor 400 is rotatably installed in the water discharge part 120. The distance sensor 400 is rotated by the angle of θ by the step motor. The control unit 500 controls the operation of the step motor.

The one-dot chain line in FIG. 8 is the virtual line extending from the nozzle 121 in the direction of gravity. The dotted line in FIG. 8 represents the range in which the distance sensor 400 scans. The distance sensor 400 generates the real-time distance information indicating the distance from the inside to the outside of the container 1 while being rotated by the angle of θ by the step motor. The two-dot chain line in FIG. 8 represents that the distance sensor 400 measures the highest point height of the container 1.

As shown in FIG. 13, when the scanning step S220 is completed, the recognizing step S230 is initiated. The recognizing step S230 is a step of recognizing the container 1 and the content 2 by comparing the real-time image information with the reference image information. The reference image information represents the image data obtained by photographing the various containers 1 and contents 2 from above.

As shown in FIGS. 6 and 7, the real-time image information includes the image information on the container 1, the content 2, and the markers 141. FIG. 6 illustrates the image information on the paper cup and the tea bag. FIG. 7 illustrates the image information on the mug and the instant coffee.

The reference image information may include the image information on the paper cup, the mug, the tea bag, and the instant coffee. As an example, at the recognizing step S230, the control unit 500 may recognize the paper cup as the container 1 and recognize the tea bag as the content 2.

The control unit 500 selects, among the stored reference image information, the reference image information that has high similarity to the real-time image information, through the image recognition technology using the convolution neural network (CNN) based deep-learning. Since the image recognition technology using the convolution neural network is a well-known technology such as GoogLeNet and ResNet, a detailed description thereof will be omitted.

As shown in FIG. 13, when the recognizing step S230 is completed, the calculating step S240 is initiated. The calculating step S240 is a step of analyzing the real-time image information and the real-time distance information in order to generate the capacity information on the container 1. The calculating step S240 includes a first calculating step S241, a second calculating step S242, and a third calculating step S243.

The first calculating step S241 is a step of calculating the area information on the container 1 and the content 2 based on the relative coordinates of the container 1, the content 2, and the plurality of markers 141 in the real-time image information.

As shown in FIGS. 6 and 7, on the seating surface 140 are formed the two or more markers 141. The two or more markers 141 form the reference coordinates for measuring the size of the container 1 in the real-time image information. The control unit 500 stores the relative coordinates, the relative distance, and the absolute distance between the two or more markers 141. The markers 141 differ in color, lightness, or saturation from the seating surface 140.

The real-time image information includes the image information on the container 1, the content 2, and the markers 141. The control unit 500 calculates the area information on the container 1 and the content 2 by analyzing the relative coordinates of the container 1, the content 2, and the markers 141.

As shown in FIGS. 5 and 6, the real-time image information may include the relative distance D1 between two or more markers 141, the diameter D2 of the outer periphery of the container 1, and the diameter D3 of a bottom surface inside the container 1. As an example, the control unit 500 calculates the area information on the container 1 using D2. In addition, the control unit 500 calculates the area information on the content 2 based on D1.

The second calculating step S242 is a step of calculating the height information on the container 1 using the lowest point height information and the highest point height information on the container 1.

As shown in FIGS. 9 and 10, the real-time distance information may include the lowest point height information and the highest point height information on the container 1. The control unit 500 may calculate the height of the inside of the container 1 using the difference between the highest point height and the lowest point height of the container 1.

The two-dot chain line in FIGS. 9 and 10 represents that the distance sensor 400 measures the lowest point height of the container 1. The one-dot chain line in FIGS. 9 and 10 represents that the distance sensor 400 measures the highest point height of the container 1. The dotted line in FIGS. 9 and 10 represent that the distance sensor 400 measures the highest point height of the content 2.

The third calculating step S243 is a step of generating the capacity information on the container 1 using the area information and the height information.

The control unit 500 may generate the capacity information on the container 1 as the product of the area and the highest point height of the container 1. The control unit 500 may generate the capacity information on the content 2 as the product of the area and the highest point height of the content 2.

As shown in FIG. 13, when the calculating step S240 is completed, the water discharging step S250 is initiated. When the water discharging step S250 is initiated, the control unit 500 discharges the water according to the reference water discharge information. That is, in the second embodiment of the present disclosure, the water is discharged according to the reference water discharge information regardless of whether the water temperature information and the amount of water information match the reference water discharge information.

As an example, the inputted water discharge information may be 40° C. and 120 ml. At the recognizing step S230, the control unit 500 may recognize the paper cup as the container 1 and recognize the tea bag as the content 2. The reference water discharge information corresponding to the image information on the paper cup and the tea bag may represent hot water of 85° C. and 130 ml. The control unit 500 discharges the water according to the reference water discharge information.

When discharging the water is initiated (S251), the distance sensor 400 generates the real-time height information on the water surface. Then, the control unit 500 continuously determines, by measuring the amount of water being discharged in real-time, whether the amount of water being discharged in real-time is equal to or greater than the amount of water information (S252). When the amount of water being discharged in real-time is equal to or greater than the amount of water information, the control unit 500 stops discharging the water (S254).

At the same time, the control unit 500 continuously determines whether the real-time height information is equal to or higher than the limit height (S253). As an example, the limit height may be set to the height of 90% of the highest point height of the container 1. When the real-time height information is equal to or higher than the limit height, the control unit 500 stops discharging the water (S254). That is, the control unit 500 stops discharging the water (S254) before the real-time height exceeds the highest point height.

Third Embodiment

Figure 14:
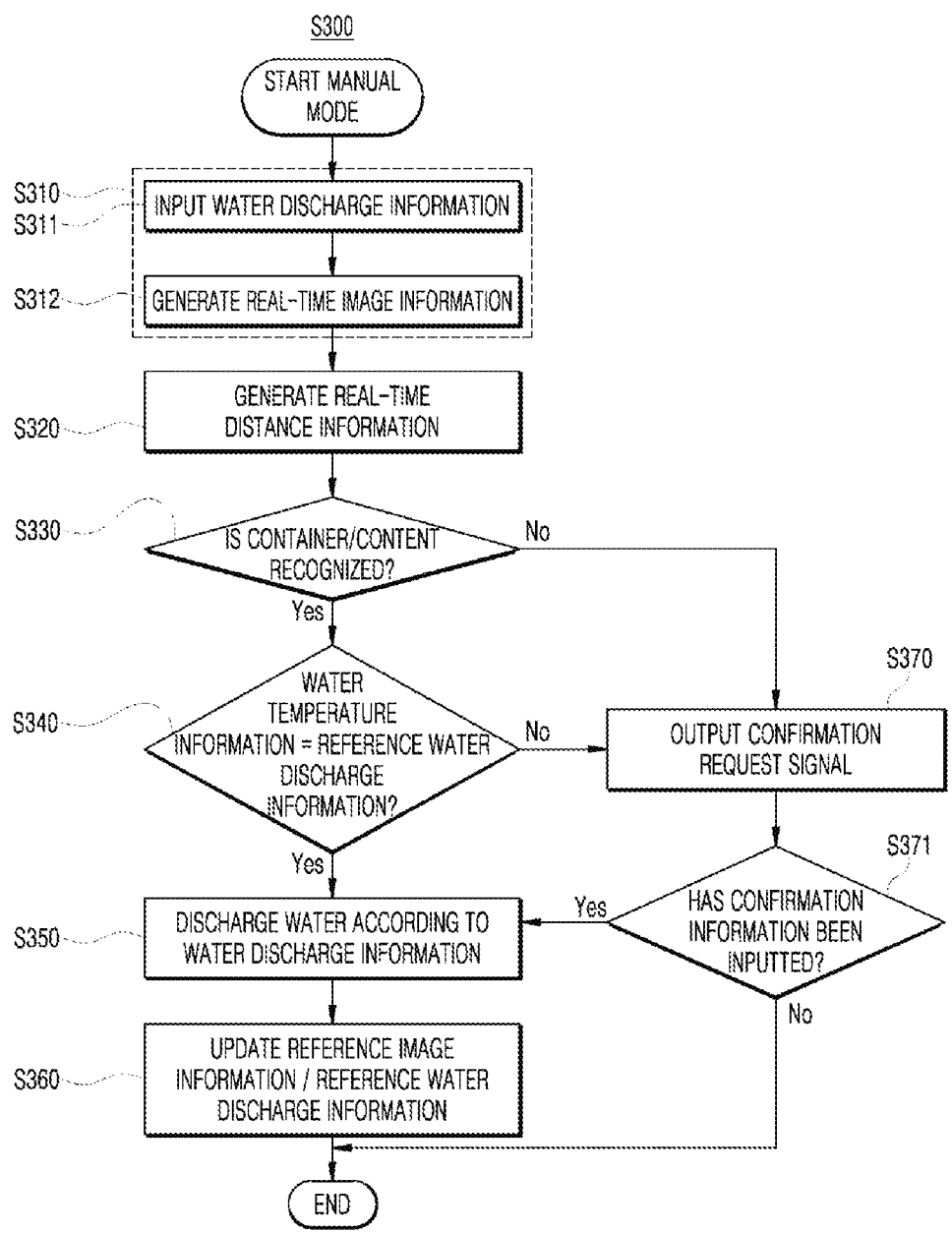
FIG. 14 is a flowchart of a control method of a water purifier according to yet another embodiment of the present disclosure.

FIG. 14 is a flowchart of a control method S300 of the water purifier 10 according to yet another embodiment of the present disclosure.

As shown in FIG. 14, the control method S300 of the water purifier 10 according to yet another embodiment of the present disclosure may include a photographing step S310, a scanning step S320, a recognizing step S330, a determining step S340, a water discharging step S350, and an updating step S360.

The photographing step S310 is a step in which, when the water discharge information including the water temperature information is inputted (S311), the camera 200 photographs the seating surface 140 to generate the real-time image information (S312).

As shown in FIG. 1, the user may input the water discharge information by pressing the manipulation button 112 after placing the container 1 on the seating surface 140 (S311). The container 1 may be the paper cup in which the tea bag is contained. The water discharge information includes the temperature information and the amount information on the water to be discharged.

The user may input the water temperature information and the amount of water information by pressing the manipulation button 112. As an example, the water temperature information and the amount of water information may be 40° C. and 120 ml. The water discharge information may be inputted by the user's voice. As an example, the user's voice may be "Puricare, make me hot coffee," or "Puricare, pour me only half a glass of hot water."

As shown in FIGS. 5 to 7, when the water discharge information is inputted, the camera 200 photographs the seating surface 140 to generate the real-time image information (S312). As shown in FIG. 5, the camera 200 is a part for photographing the seating surface 140 to generate the real-time image information (S312). The lamp 300 illuminates the seating surface 140 during the operation of the camera 200.

The one-dot chain line in FIG. 5 is a virtual line extending from the nozzle 121 in the direction of gravity. The dotted line in FIG. 5 represents the range in which the camera 200 photographs. The two-dot chain line in FIG. 5 represents the center of the range in which the camera 200 photographs.

As shown in FIGS. 6 and 7, the real-time image information includes the image information on the container 1, the content 2, and the markers 141. FIG. 6 illustrates the image information on the paper cup and the tea bag. FIG. 7 illustrates the image information on the mug and the instant coffee.

As shown in FIG. 14, when the photographing step S310 is completed, the scanning step S320 is initiated. The scanning step S320 is a step of scanning, by the distance sensor 400, the seating surface 140 to generate the real-time distance information.

As shown in FIG. 8, the distance sensor 400 is a part for scanning the seating surface 140 to generate the real-time distance information. The distance sensor 400 may be a laser sensor, an ultrasonic sensor, and the like. The distance sensor 400 is rotatably installed in the water discharge part 120. The distance sensor 400 is rotated by the angle of θ by the step motor. The control unit 500 controls the operation of the step motor.

The one-dot chain line in FIG. 8 is a virtual line extending from the nozzle 121 in the direction of gravity. The dotted line in FIG. 8 represents the range in which the distance sensor 400 scans. The distance sensor 400 generates the real-time distance information indicating the distance from the inside to the outside of the container 1 while being rotated by the angle of θ by the step motor. The two-dot chain line in FIG. 8 represents that the distance sensor 400 measures the highest point height of the container 1.

As shown in FIG. 14, when the scanning step S320 is completed, the recognizing step S330 is initiated. The recognizing step S330 is a step of comparing the real-time image information and the reference image information to determine whether the container 1 and the content 2 are recognized. The reference image information represents the image data obtained by photographing the various containers 1 or contents 2 from above.

As shown in FIGS. 6 and 7, the real-time image information includes the image information on the container 1, the content 2, and the markers 141. FIG. 6 illustrates the image information on the paper cup and the tea bag. FIG. 7 illustrates the image information on the mug and the instant coffee.

The reference image information may include the image information on the paper cup, the mug, the tea bag, and the instant coffee. As an example, at the recognizing step S330, the control unit 500 may recognize the paper cup as the container 1 and recognize the tea bag as the content 2.

The control unit 500 selects, among the stored reference image information, the reference image information that has high similarity to the real-time image information, through the image recognition technology using the convolution neural network (CNN) based deep-learning. Since the image recognition technology using the convolution neural network is a well-known technology such as GoogLeNet and ResNet, a detailed description thereof will be omitted.

As shown in FIG. 14, when the container 1 and the content 2 are not recognized at the recognizing step S330, the control unit 500 outputs the confirmation request signal (S370).

The reference image information and the reference water discharge information on basic container 1 and content 2 may be inputted to the water purifier 10 at the time of manufacturing. The above-mentioned basic container 1 may represent the container 1 frequently used by people, for example, a paper cup, a mug, and the like.

The above-mentioned basic content 2 may represent a tea bag, instant coffee, and the like that people often drink. However, it is difficult for the reference image information and the reference water discharge information inputted at the time of manufacturing to include all information including information on the container 1 of an unusual type as well as information on the content 2 which is not often drunk.

The confirmation request signal may be outputted as a voice (S370). The control unit 500 may be connected to the voice output unit 700. The voice output unit 700 may receive the voice data from the control unit 500 and output the voice. As an example, the voice data may be "The container 1 and the content 2 are not recognized."

The user may listen to the confirmation request signal and may input the confirmation information (S371). When the user presses the water discharge button 111 (S371), the control unit 500 discharges the water according to the water discharge information (S350). When the user re-enters the water discharge information by pressing the manipulation button 112 and the water discharge button 111 (S371), the control unit 500 discharges the water according to the re-entered water discharge information (S350).

The confirmation information may be inputted by the user's voice (S371). As an example, the user's voice may be "Puricare, I have checked." The control unit 500 discharges the water according to the water discharge information (S350). As an example, the user's voice may be "Puricare, do it yourself." The control unit 500 discharges the water according to water discharge information set by default. As an example, a temperature and an amount that are set by default water discharge information may be 40° C. and 100 ml.

When the confirmation information is not inputted during the set time after the confirmation request signal is outputted (S370), the water is not discharged and the manual mode is ended.

As shown in FIG. 14, when the container 1 and the content 2 are recognized at the recognizing step S330, the determining step S340 is initiated. The determining step S340 is a step of determining whether the water temperature information and the amount of water information match the reference water discharge information.

As an example, the inputted water discharge information may be 85° C. and 130 ml. At the recognizing step S330, the control unit 500 may recognize the paper cup as the container 1 and recognize the tea bag as the content 2. In addition, the reference water discharge information corresponding to the image information on the paper cup and the tea bag may be 85° C. and 130 ml.

As shown in FIG. 14, when, at the determining step S340, the water temperature information and the amount of water information match the reference water discharge information, the water discharging step S350 is initiated. When the water discharging step S350 is initiated, the control unit 500 discharges the water according to the water discharge information.

As shown in FIG. 14, when, at the determining step S340, the water temperature information and the amount of water information do not match the reference water discharge information, the control unit 500 outputs the confirmation request signal (S370).

As an example, the inputted water discharge information may be 40° C. and 120 ml. At the recognizing step S330, the control unit 500 may recognize the paper cup as the container 1 and recognize the tea bag as the content 2. In addition, the reference water discharge information corresponding to the image information on the paper cup and the tea bag may represent hot water of 85° C. and 130 ml.

The confirmation request signal may be outputted as a voice (S370). The control unit 500 may be connected to the voice output unit 700. The voice output unit 700 may receive the voice data from the control unit 500 and output the voice. As an example, the voice data may be "Please check the temperature and the amount of the water."

The user may listen to the confirmation request signal and may input the confirmation information (S371). When the user presses the water discharge button 111 (S371), the control unit 500 discharges the water according to the water discharge information (S350). When the user re-enters the water discharge information by pressing the manipulation button 112 and the water discharge button 111 (S371), the control unit 500 discharges the water according to the re-entered water discharge information (S350).

The confirmation information may be inputted by the user's voice (S371). As an example, the user's voice may be "Puricare, I have checked." The control unit 500 discharges the water according to the water discharge information (S350). As an example, the user's voice may be "Puricare, do it yourself." The control unit 500 discharges the water according to the reference water discharge information.

When the confirmation information is not inputted during the set time after the confirmation request signal is outputted (S370), the water is not discharged and the manual mode is ended.

As shown in FIG. 14, when the water discharging step S350 is completed, the updating step S360 is initiated. At the updating step S360, the control unit 500 updates the reference image information and the reference water discharge information. The reference image information and the reference water discharge information are updated to include real-time image information, real-time distance information, and water discharge information that have been most recently generated.

At the updating step S360, the real-time image information, the real-time distance information, and the water discharge information that have been most recently generated may be transmitted to the management server through the network. The management server may store previous reference image information and reference water discharge information. The previous reference image information and reference water discharge information stored in the management server are updated to include the real-time image information, the real-time distance information, and the water discharge information that have been most recently generated. The management server feeds back the updated real-time distance information and water discharge information to the water purifier 10 through the network.

The management server may be a database server that provides big data needed to apply various artificial intelligence algorithms and data for operating the water purifier 10.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

The network may serve to connect the water purifier 10 to the management server. The network may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 400 may also send and receive information using short distance communication or long distance communication. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network may include connection of network elements such as hubs, bridges, routers, switches, and gateways. The network may include one or more connected networks, including a public network such as the Internet and a private network such as a secure corporate private network. For example, the network may include a multi-network environment. Access to the network may be provided via one or more wired or wireless access networks. Further, the network may support 5G communication or an Internet of things (IoT) network for exchanging and processing information between distributed components such as objects.

And, the water purifier 10 may include a communication unit. The communication unit may provide a communication interface required to provide signals transmitted/received between the water purifier 10 and the management server in the form of packet data in cooperation with the network. The communication unit 110 may support various kinds of object intelligence communications (such as Internet of things (IoT), Internet of everything (IoE), and Internet of small things (IoST)) and may support communications such as machine to machine (M2M) communication, vehicle to everything communication (V2X), and device to device (D2D) communication.

In the control method S300 of the water purifier 10 according to the third embodiment of the present disclosure, when the user has on one occasion discharged water from the water purifier 10 into the container 1 of an unusual type or into the content 2 which is not often drunk, the water purifier 10 may, at the time of the next execution, recognize the container 1 of the unusual type or the content 2 which is not often drunk, and discharge the water according to reference water discharge information on the container 1 or the content 2.

Fourth Embodiment

Figure 15:
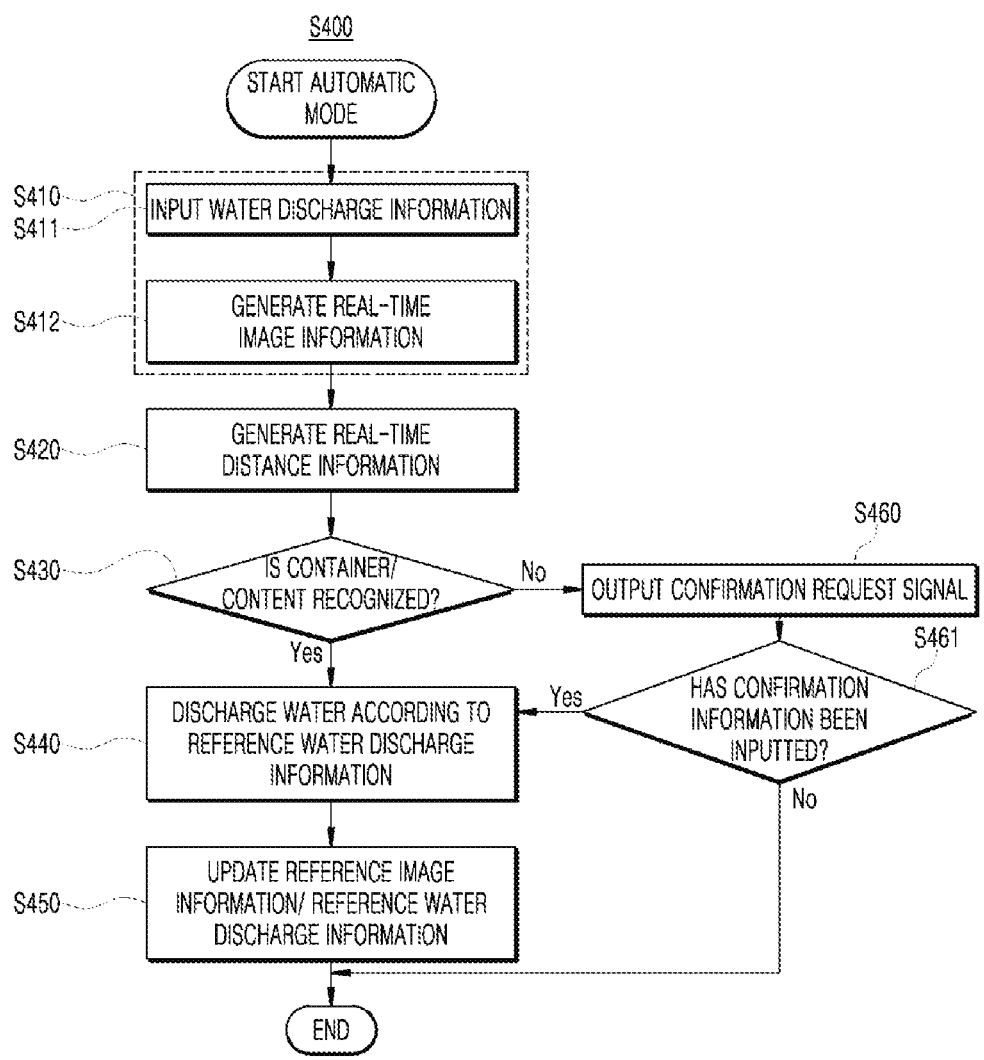
FIG. 15 is a flowchart of a control method of a water purifier according to yet another embodiment of the present disclosure.

FIG. 15 is a flowchart of a control method S400 of the water purifier 10 according to yet another embodiment of the present disclosure.

As shown in FIG. 15, the control method S400 of the water purifier 10 according to yet another embodiment of the present disclosure may include a photographing step S410, a scanning step S420, a recognizing step S430, a water discharging step S440, and an updating step S450.

The photographing step S410 is a step in which, when the water discharge information including the water temperature information is inputted (S411), the camera 200 photographs the seating surface 140 to generate the real-time image information (S412).

As shown in FIG. 1, the user may input the water discharge information by pressing the manipulation button 112 after placing the container 1 on the seating surface 140 (S411). The container 1 may be the paper cup in which the tea bag is contained. The water discharge information includes the temperature information and the amount information on the water to be discharged.

The user may input the water temperature information and the amount of water information by pressing the manipulation button 112. As an example, the water temperature information and the amount of water information may be 40° C. and 120 ml. The water discharge information may be inputted by the user's voice. As an example, the user's voice may be "Puricare, make me hot coffee," or "Puricare, pour me only half a glass of hot water."

As shown in FIGS. 5 to 7, when the water discharge information is inputted, the camera 200 photographs the seating surface 140 to generate the real-time image information (S412). As shown in FIG. 5, the camera 200 is a part for photographing the seating surface 140 to generate the real-time image information (S412). The lamp 300 illuminates the seating surface 140 during the operation of the camera 200.

The one-dot chain line in FIG. 5 is a virtual line extending from the nozzle 121 in the direction of gravity. The dotted line in FIG. 5 represents the range in which the camera 200 photographs. The two-dot chain line in FIG. 5 represents the center of the range in which the camera 200 photographs.

As shown in FIGS. 6 and 7, the real-time image information includes the image information on the container 1, the content 2, and the markers 141. FIG. 6 illustrates the image information on the paper cup and the tea bag. FIG. 7 illustrates the image information on the mug and the instant coffee.

As shown in FIG. 15, when the photographing step S410 is completed, the scanning step S420 is initiated. The scanning step S420 is a step of scanning, by the distance sensor 400, the seating surface 140 to generate the real-time distance information.

As shown in FIG. 8, the distance sensor 400 is a part for scanning the seating surface 140 to generate the real-time distance information. The distance sensor 400 may be a laser sensor, an ultrasonic sensor, and the like. The distance sensor 400 is rotatably installed in the water discharge part 120. The distance sensor 400 is rotated by the angle of θ by the step motor. The control unit 500 controls the operation of the step motor.

The one-dot chain line in FIG. 8 is a virtual line extending from the nozzle 121 in the direction of gravity. The dotted line in FIG. 8 represents the range in which the distance sensor 400 scans. The distance sensor 400 generates the real-time distance information indicating the distance from the inside to the outside of the container 1 while being rotated by the angle of θ by the step motor. The two-dot chain line in FIG. 8 represents that the distance sensor 400 measures the highest point height of the container 1.

As shown in FIG. 15, when the scanning step S420 is completed, the recognizing step S430 is initiated. The recognizing step S430 is a step of comparing the real-time image information and the reference image information to determine whether the container 1 and the content 2 are recognized. The reference image information represents the image data obtained by photographing the various containers 1 or contents 2 from above.

As shown in FIGS. 6 and 7, the real-time image information includes the image information on the container 1, the content 2, and the markers 141. FIG. 6 illustrates the image information on the paper cup and the tea bag. FIG. 7 illustrates the image information on the mug and the instant coffee.

The reference image information may include the image information on the paper cup, the mug, the tea bag, and the instant coffee. As an example, at the recognizing step S430, the control unit 500 may recognize the paper cup as the container 1 and recognize the tea bag as the content 2.

The control unit 500 selects, among the stored reference image information, the reference image information that has high similarity to the real-time image information, through the image recognition technology using the convolution neural network (CNN) based deep-learning. Since the image recognition technology using the convolution neural network is a well-known technology such as GoogLeNet and ResNet, a detailed description thereof will be omitted.

As shown in FIG. 15, when the container 1 and the content 2 are not recognized at the recognizing step S430, the control unit 500 outputs the confirmation request signal (S460).

The reference image information and the reference water discharge information on the basic container 1 and content 2 may be inputted to the water purifier 10 at the time of manufacturing. The above-mentioned basic container 1 may represent the container 1 frequently used by people, for example, a paper cup, a mug, and the like.

The above-mentioned basic content 2 may represent a tea bag, instant coffee, and the like that people often drink. However, it is difficult for the reference image information and the reference water discharge information inputted at the time of manufacturing to include all information including information on the container 1 of an unusual type as well as information on the content 2 which is not often drunk.

The confirmation request signal may be outputted as a voice (S460). The control unit 500 may be connected to the voice output unit 700. The voice output unit 700 may receive the voice data from the control unit 500 and output the voice. As an example, the voice data may be "The container 1 and the content 2 are not recognized."

The user may listen to the confirmation request signal and may input the confirmation information (S461). When the user presses the water discharge button 111 (S461), the control unit 500 discharges the water according to the water discharge information (S461). When the user re-enters the water discharge information by pressing the manipulation button 112 and the water discharge button 111 (S461), the control unit 500 discharges the water according to the re-entered water discharge information (S461).

The confirmation information may be inputted by the user's voice (S461). As an example, the user's voice may be "Puricare, I have checked." The control unit 500 discharges the water according to the water discharge information (S461). As an example, the user's voice may be "Puricare, do it yourself." The control unit 500 discharges the water according to the water discharge information set by default. As an example, the temperature and the amount set by the default water discharge information may be 40° C. and 100 ml.

When the confirmation information is not inputted during the set time after the confirmation request signal is outputted (S460), the water is not discharged and the manual mode is ended.

As shown in FIG. 15, when the container 1 and the content 2 are recognized at the recognizing step S430, the water discharging step S440 is initiated. When the water discharging step S440 is initiated, the control unit 500 discharges the water according to the reference water discharge information.

As an example, the inputted water discharge information may be 40° C. and 120 ml. At the recognizing step S430, the control unit 500 may recognize the paper cup as the container 1 and recognize the tea bag as the content 2. In addition, the reference water discharge information corresponding to the image information on the paper cup and the tea bag may represent hot water of 85° C. and 130 ml. The control unit 500 discharges the water according to the reference water discharge information.

As shown in FIG. 15, when the water discharging step S440 is completed, the updating step S450 is initiated. At the updating step S450, the control unit 500 updates the reference image information and the reference water discharge information. That is, the reference image information and the reference water discharge information are updated to include the real-time image information, the real-time distance information, and the water discharge information that have been most recently generated.

In the control method S400 of the water purifier 10 according to the fourth embodiment of the present disclosure, when the user has on one occasion discharged water from the water purifier 10 into the container 1 of an unusual type or into the content 2 which is not often drunk, the water purifier 10 may, at the time of the next execution, recognize the container 1 of the unusual type or the content 2 which is not often drunk, and discharge the water according to the reference water discharge information on the container 1 or the content 2.

Fifth Embodiment

Figure 16:
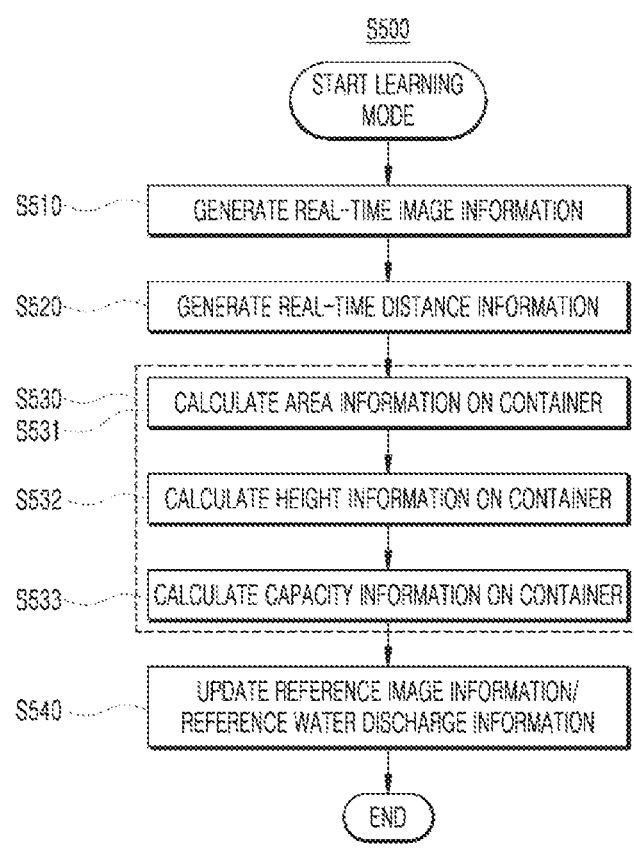
FIG. 16 is a flowchart of a control method of a water purifier according to yet another embodiment of the present disclosure.

FIG. 16 is a flowchart of a control method S500 of the water purifier 10 according to yet another embodiment of the present disclosure.

As shown in FIG. 16, the control method S500 of the water purifier 10 according to yet another embodiment of the present disclosure may include a photographing step S510, a scanning step S520, a calculating step S530, and an updating step S540.

The photographing step S510 is a step in which, when the user inputs the learning mode, the camera 200 photographs the seating surface 140 to generate the real-time image information (S510).

As shown in FIG. 1, the user may initiate the learning mode by pressing the manipulation button 112 after placing the container 1 on the seating surface 140. The learning mode is a mode for learning the container 1. In the learning mode, the content 2 is not contained in the container 1. In the following description with reference to FIGS. 5 to 10, it is assumed that the content 2 is not present in the container 1.

Referring to FIGS. 5 to 7, when the user inputs the learning mode, the camera 200 photographs the seating surface 140 to generate the real-time image information (S510). As shown in FIG. 5, the camera 200 is a part for photographing the seating surface 140 to generate the real-time image information (S510). The lamp 300 illuminates the seating surface 140 during the operation of the camera 200.

The one-dot chain line in FIG. 5 is a virtual line extending from the nozzle 121 in the direction of gravity. The dotted line in FIG. 5 represents the range in which the camera 200 photographs. The two-dot chain line in FIG. 5 represents the center of the range in which the camera 200 photographs.

Referring to FIGS. 6 and 7, the real-time image information includes the image information on the container 1 and the markers 141. FIG. 6 illustrates the image information on the paper cup. FIG. 7 illustrates the image information on the mug.

As shown in FIG. 16, when the photographing step S510 is completed, the scanning step S520 is initiated. The scanning step S520 is a step of scanning, by the distance sensor 400, the seating surface 140 to generate the real-time distance information.

As shown in FIG. 8, the distance sensor 400 is a part for scanning the seating surface 140 to generate the real-time distance information. The distance sensor 400 may be a laser sensor, an ultrasonic sensor, and the like. The distance sensor 400 is rotatably installed in the water discharge part 120. The distance sensor 400 is rotated by the angle of θ by the step motor. The control unit 500 controls the operation of the step motor.

The one-dot chain line in FIG. 8 is a virtual line extending from the nozzle 121 in the direction of gravity. The dotted line in FIG. 8 represents the range in which the distance sensor 400 scans. The distance sensor 400 generates the real-time distance information indicating the distance from the inside to the outside of the container 1 while being rotated by the angle of θ by the step motor. The two-dot chain line in FIG. 8 represents that the distance sensor 400 measures the highest point height of the container 1.

As shown in FIG. 16, when the scanning step S520 is completed, the calculating step S530 is initiated. The calculating step S530 is a step of analyzing the real-time image information and the real-time distance information to generate the capacity information on the container 1. The calculating step S530 includes a first calculating step S531, a second calculating step S532, and a third calculating step S533.

The first calculating step S531 is a step of calculating the area information on the container 1 and the content 2 based on the relative coordinates of the container 1, the content 2, and the plurality of markers 141 in the real-time image information.

As shown in FIGS. 6 and 7, on the seating surface 140 are formed the two or more markers 141. The two or more markers 141 form the reference coordinates for measuring the size of the container 1 in the real-time image information. The control unit 500 stores the relative coordinates, the relative distance, and the absolute distance between the two or more markers 141. The markers 141 differ in color, lightness, or saturation from the seating surface 140.

The real-time image information includes the image information on the container 1 and the markers 141. The control unit 500 calculates the area information on the container 1 by analyzing the relative coordinates of the container 1 and the markers 141. As shown in FIGS. 5 and 6, the real-time image information may include the relative distance D1 between the two or more markers 141, the diameter D2 of the outer periphery of the container 1, and the diameter D3 of a bottom surface inside the container 1. As an example, the control unit 500 may calculate the area information on the container 1 using the average value of D2 and D3.

The second calculating step S532 is a step of calculating the height information on the container 1 using the lowest point height information and the highest point height information on the container 1.

As shown in FIG. 9, the real-time distance information may include the lowest point height information and the highest point height information on the container 1. The control unit 500 may calculate the height of the inside of the container 1 using the difference between the highest point height and the lowest point height of the container 1.

The two-dot chain line in FIG. 9 represents that the distance sensor 400 measures the lowest point height of the container 1. The one-dot chain line in FIG. 9 represents that the distance sensor 400 measures the highest point height of the container 1.

The third calculating step S533 is a step of generating the capacity information on the container 1 using the area information and the height information. The control unit 500 may generate the capacity information on the container 1 as the product of the area and the highest point height of the container 1.

As shown in FIG. 16, when the calculating step 5530 is completed, the updating step S540 is initiated. At the updating step S540, the control unit 500 updates the reference image information and the reference water discharge information. The reference image information and the reference water discharge information are updated to include the real-time image information, the real-time distance information, and the capacity information.

Here, updating the reference image information and the reference water discharge information may mean generating the reference image information and the reference water discharge information by the real-time image information, the real-time distance information, and the capacity information that are generated in the learning mode. The reference water discharge information may represent an amount of water information corresponding to 70% of the capacity information.

The reference image information and the reference water discharge information on the basic container 1 may be inputted to the water purifier 10 at the time of manufacturing. The above-mentioned basic container 1 may represent the container 1 frequently used by people, for example, a paper cup, a mug, and the like. However, it is difficult for the reference image information and the reference water discharge information inputted at the time of manufacturing to include all information including the information on the container 1 of an unusual type.

In the control method S500 of the water purifier 10 according to the fifth embodiment of the present disclosure, when the user has caused the water purifier 10 to learn about the container 1 of the unusual type on one occasion, the water purifier 10 may, at the time of the next execution, automatically recognize the container 1 of the unusual type, and discharge the water according to the reference water discharge information on the container 1.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, substitutions, and modifications may be made within the scope of the appended claims or equivalents thereof. It should be apparent to those skilled in the art that various substitutions, changes and modifications which are not exemplified herein but are still within the spirit and scope of the present disclosure may be made.

The present disclosure is thus not limited to the example embodiments described above, and rather intended to include the following appended claims, and all modifications, equivalents, and alternatives falling within the spirit and scope of the following claims.

DESCRIPTION OF SYMBOLS

| | |
|---|---|
| 10: Water purifier | 200: Camera |
| 100: Main body | 300: Lamp |
| 110: Manipulation unit | 400: Distance sensor |
| 111: Water discharge button | 500: Control unit |
| 112: Manipulation button | 600: Voice input unit |
| 120: Water discharge part | 700: Voice output unit |
| 121: Nozzle | 1: Container |
| 130: Rotator | 2: Content |
| 140: Seating surface | |
| 141: Marker | |
| S100, S200, S300, S400, S500: Control method | |
| S110, S210, S310, S410, S510: photographing step | |
| S120, S220, S320, S420, S520: Scanning step | |
| S130, S230, S330, S430, S530: Recognizing step | |
| S140, S240: Calculating step | |
| S150, S340: Determining step | |
| S160, S250, S350, S440: Water discharging step | |
| S360, S450, S540: Updating step | |

What is claimed is:

1. A control method of a water purifier for discharging water into a container,
the water purifier comprising:
a main body configured to form a seating surface on which the container is placed, and to discharge water into the container;
a camera and a distance sensor that are installed vertically over the seating surface and that face the seating surface; and
a control unit configured to control operations of the main body, the camera, and the distance sensor, and to store reference image information and reference water discharge information on each of the container and content contained in the container,
the control method comprising:
a photographing step for photographing, by the camera, the seating surface to generate real-time image information, when water discharge information is inputted;
a scanning step for scanning, by the distance sensor, the seating surface to generate real-time distance information;
a recognizing step for recognizing the container and the content by comparing the real-time image information and the reference image information; and
a water discharging step for discharging the water according to the water discharge information or the reference water discharge information,
wherein the real-time distance information includes lowest point height information and highest point height information on the container; and
wherein when the water discharging step is initiated, the distance sensor is configured to generate real-time height information on a water surface and stop discharging the water before a real-time height exceeds the highest point height.

2. The control method according to claim 1, wherein:
the water discharge information comprises temperature information on the water;
a determining step is further performed before the water discharging step;
at the determining step, it is determined whether the water temperature information matches the reference water discharge information; and
when the water temperature information matches the reference water discharge information, at the water discharging step, the water is discharged according to the water discharge information.

3. The control method according to claim 2, wherein when, at the determining step, the water temperature information does not match the reference water discharge information, a confirmation request signal is outputted.

4. The control method according to claim 1, wherein when the container and the content are recognized at the recognizing step, at the water discharging step, the water is discharged according to the reference water discharge information.

5. The control method according to claim 1, wherein when the container and the content are not recognized at the recognizing step, a confirmation request signal is outputted.

6. The control method according to claim 1, wherein an updating step is further performed after the water discharging step; and
at the updating step, the reference image information and the reference water discharge information are updated to include the real-time image information, the real-time distance information, and the water discharge information.

7. The control method according to claim 1, wherein:
the reference water discharge information comprises at least one of the water temperature information or amount of water information;
a calculating step is further performed before the water discharging step;
at the calculating step, the real-time image information and the real-time distance information are analyzed to generate capacity information on the container; and at the water discharging step, the water is discharged according to the reference water discharge information and the capacity information, instead of the water discharge information.

8. The control method according to claim 7, wherein:

two or more markers are provided on the seating surface;

the control unit stores relative coordinates of the two or more markers; and the calculating step comprises a first calculating step for calculating area information on the container based on the relative coordinates of the container and the plurality of markers in the real-time image information.

9. The control method according to claim 8, wherein the calculating step comprises:

a second calculating step for calculating height information on the container using the lowest point height information and the highest point height information on the container; and a third calculating step for calculating the capacity information on the container using the area information and the height information.

10. A control method of a water purifier for recognizing a container, the water purifier comprising:

a main body configured to form a seating surface on which the container is placed, and to discharge water into the container;

a camera and a distance sensor that are disposed vertically over the seating surface and that face the seating surface; and a control unit configured to control operations of the main body, the camera, and the distance sensor, and to store reference image information and reference water discharge information on the container, the control method comprising:

a photographing step for photographing, by the camera, the seating surface to generate real-time image information on the container;

a scanning step for scanning, by the distance sensor, the seating surface to generate real-time distance information on the container; and a calculating step for analyzing the real-time image information and the real-time distance information to generate capacity information on the container, wherein the reference image information and the reference water discharge information are updated to include the real-time image information, the real-time distance information, and the capacity information.

11. A water purifier for recognizing a container and content contained in the container and discharging water, the water purifier comprising:

a main body configured to form a seating surface on which the container is placed, and to discharge water into the container;

a camera and a distance sensor that are disposed vertically over the seating surface and that face the seating surface; and a control unit configured to control operations of the main body, the camera, and the distance sensor, wherein the camera is configured to photograph the seating surface to generate real-time image information, wherein the distance sensor is configured to scan the seating surface to generate lowest point height information and highest point height information on the container before the water is discharged, and to generate real-time height information on a water surface after the water is discharged, wherein the control unit is configured to stop discharging the water before a real-time height exceeds the highest point height, and wherein the control unit is configured to compare at least one of the reference image information on the container or the reference image information on the content with the real-time image information, and to control the amount of water to be discharged according to the comparison result.

12. A water purifier for recognizing a container and content contained in the container and discharging water, the water purifier comprising:

a main body configured to form a seating surface on which the container is placed, and to discharge water into the container;

a camera and a distance sensor that are disposed vertically over the seating surface and that face the seating surface; and a control unit configured to control operations of the main body, the camera, and the distance sensor, wherein the camera is configured to photograph the seating surface to generate real-time image information, wherein the distance sensor is configured to scan the seating surface to generate lowest point height information and highest point height information on the container before the water is discharged, and to generate real-time height information on a water surface after the water is discharged, wherein the control unit is configured to stop discharging the water before a real-time height exceeds the highest point height, wherein two or more markers are provided on the seating surface, and wherein the control unit is configured to:

store relative coordinates of the two or more markers; and calculate area information on the container based on the relative coordinates of the container and the plurality of markers in the real-time image information.

* * * * *